(12) United States Patent
Kim et al.

(10) Patent No.: US 9,329,426 B2
(45) Date of Patent: *May 3, 2016

(54) OPTICAL ELEMENT

(71) Applicant: LG CHEM, LTD., Seoul (KR)

(72) Inventors: Sin Young Kim, Daejeon (KR); Moon Soo Park, Daejeon (KR); Seung Hun Chae, Daejeon (KR); Su Young Ryu, Daejeon (KR); Da Mi Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,189

(22) Filed: Nov. 30, 2012

(65) Prior Publication Data

US 2013/0208197 A1 Aug. 15, 2013

Related U.S. Application Data

(63) Continuation of application No. PCT/KR2012/009799, filed on Nov. 19, 2012.

(30) Foreign Application Priority Data

Nov. 17, 2011 (KR) .......................... 10-2011-0120191
Nov. 19, 2012 (KR) .......................... 10-2012-0131004

(51) Int. Cl.
*G02F 1/1335* (2006.01)
*G02F 1/13* (2006.01)
*G02B 5/30* (2006.01)
*G02B 27/26* (2006.01)

(52) U.S. Cl.
CPC ............ *G02F 1/1335* (2013.01); *G02B 5/3016* (2013.01); *G02B 27/26* (2013.01); *G02F 1/1313* (2013.01)

(58) Field of Classification Search
None
See application file for complete search history.

(56) References Cited

U.S. PATENT DOCUMENTS

| | | | |
|---|---|---|---|
| 6,368,760 B1 | 4/2002 | Nishiguchi | |
| 8,305,503 B1 | 11/2012 | Hoshi | |
| 2004/0189909 A1 | 9/2004 | Kashima | |
| 2006/0114392 A1 | 6/2006 | Tanaka | |
| 2006/0115607 A1* | 6/2006 | Nam et al. | 428/1.2 |
| 2008/0241431 A1 | 10/2008 | Hirai | |
| 2009/0251642 A1* | 10/2009 | Nakamura et al. | 349/75 |
| 2010/0039590 A1* | 2/2010 | Miyatake et al. | 349/96 |
| 2011/0236681 A1* | 9/2011 | Kim et al. | 428/343 |

FOREIGN PATENT DOCUMENTS

| | | |
|---|---|---|
| CN | 1748161 A | 3/2006 |
| JP | 10-153707 | 6/1998 |
| JP | 10-153707 A | 6/1998 |
| JP | 200599237 A | 4/2005 |
| JP | 2006-259212 | 9/2006 |
| JP | 2008-122885 | 5/2008 |
| JP | 2010-066630 | 3/2010 |

(Continued)

*Primary Examiner* — Cynthia H Kelly
*Assistant Examiner* — Anna Malloy
(74) *Attorney, Agent, or Firm* — Dentons US LLP

(57) ABSTRACT

The present application relates to an optical device. The optical device according to one embodiment may be a light-dividing device, for example, a device that can divide incident light into at least two kinds of light having different polarization states. For example, the optical device can be used to realize a stereoscopic image.

11 Claims, 9 Drawing Sheets

(56) References Cited

FOREIGN PATENT DOCUMENTS

| | | |
|---|---|---|
| JP | 4508280 B2 | 5/2010 |
| JP | 2010-126651 A | 6/2010 |
| JP | 2011-29161 A | 2/2011 |
| JP | 2011215562 A | 10/2011 |
| JP | 2012-108465 A | 6/2012 |
| KR | 10-0209187 | 7/1999 |
| KR | 10-2004-0104403 A | 12/2004 |
| KR | 10-2006-0041921 A | 5/2006 |
| KR | 10-2011-0097753 | 8/2011 |
| TW | I253522 B | 4/2006 |
| TW | 200804569 A | 1/2008 |
| TW | 201022741 A1 | 6/2010 |

\* cited by examiner

Fig. 2

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig. 8

| LG | RG | LG | RG | LG | RG |

Fig. 9

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

This application is a continuation application of PCT/KR2012/009799, filed on Nov. 19, 2012, and claims priority to Korean Patent Application Nos. 10-2011-0120191, filed Nov. 17, 2011 and 10-2012-0131004 filed Nov. 19, 2012, all of which are incorporated by reference in their entirety herein.

TECHNICAL FIELD

The present application relates to an optical device and the use thereof.

BACKGROUND

Light division techniques relate to dividing light into at least two kinds of light having different polarization states and have been used in various fields.

The light division techniques may be, for example, applied to form stereoscopic images. The stereoscopic images may be formed using binocular parallax. For example, if two 2-dimensional images are input into the human left and right eyes, respectively, the input information is transmitted to and combined in the brain, it becomes possible for a human being to experience 3-dimensional (3D) senses of depth and reality. During the above process, the light division techniques may be used.

Techniques to form the stereoscopic image may be effectively used for 3D measurements, and also used in 3D TV, cameras or computer graphics.

PRIOR-ART PATENT DOCUMENTS

Patent Document 1: Japanese Patent Publ. No. 2005-049865
Patent Document 2: Korean Patent No. 0967899
Patent Document 3: Korean Patent Publ. No. 2010-0089782

DETAILED DESCRIPTION

Technical Object

The present application provides an optical device and the use thereof.

Technical Solution

The present application relates to an optical device. The term "optical device" as used herein may include every kinds of optical apparatuses, optical parts or optical elements, each of which exhibits one or more predetermined function. In one embodiment, the "optical device" may refer to a device having a sheet or film shape. For example, the optical device may be a device configured to divide incident light into two or more kinds of light having different polarization states to each other.

The optical device may include a liquid crystal layer. The liquid crystal layer in the optical device may satisfy the following General Formula 1.

$X<8\%$            General Formula 1

In General Formula 1, X represents a percentage of the absolute value of a variation in a phase difference value of the liquid crystal layer obtained after keeping the liquid crystal layer at 80° C. for 100 hours or 250 hours, relative to the initial phase difference value of the liquid crystal layer.

The "X" may be, for example, calculated by the formula "$100\times(|R_0-R_1|)/R_0$." In the above, the "$R_0$" is an initial phase difference value of the liquid crystal layer, and the "$R_1$" is a phase difference value of the liquid crystal layer obtained after keeping the liquid crystal layer at 80° C. for 100 hours or 250 hours. The X" may be, for example, 7% or less, 6% or less or 5% or less. The variation in the phase difference value may be measured using a method presented in the following Examples.

In one embodiment, a difference between the refractive index of the liquid crystal layer in the in-plane slow axis direction and the refractive index of the liquid crystal layer in the in-plane fast axis direction may be from 0.05 to 0.2, from 0.07 to 0.2, from 0.09 to 0.2 or from 0.1 to 0.2. The term "refractive index of or in the in-plane slow axis direction" may refer to a refractive index in a direction in which the maximum value of the refractive index is measured in the plane of the liquid crystal layer, and the term "refractive index of or in the in-plane fast axis direction" may refer to a refractive index in a direction in which the minimum value of the refractive index is measured in the plane of the liquid crystal layer. In general, the fast axis and slow axis in an optically anisotropic liquid crystal layer are formed to be vertical to each other. The refractive indexes may be measured with respect to light having a wavelength of 550 nm or 589 nm. The difference between the refractive indexed may be measured by using Axoscan (commercially available from Axomatrix) according to the manufacturer's manual.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for applied use. In one embodiment, the liquid crystal layer satisfying the relationship of the refractive indexes and having the thickness may be suitable for use in an optical device for light division.

The liquid crystal layer may include a polymerizable liquid crystal compound. In one embodiment, the polymerizable liquid crystal compound may be included in the liquid crystal layer in a polymerized form. The term "polymerizable liquid crystal compound" as used herein may refer to a compound that includes at least one part capable of showing liquid crystalline property, such as a mesogen backbone, and also includes at least one polymerizable functional group. Also, the term "polymerizable liquid crystal compound included in a polymerized form" may refer to a state where the liquid crystal compound is polymerized so as to form a skeleton of a liquid crystal polymer, such as a main chain or a side chain, in the liquid crystal layer.

In one embodiment, the liquid crystal layer may also include a polymerizable liquid crystal compound that is not polymerized, or may further include a conventional additive such as a polymerizable non-liquid crystalline compound, a stabilizer, a non-polymerizable non-liquid crystalline compound or an initiator.

In one embodiment, the polymerizable liquid crystal compound in the liquid crystal layer may include a multifunctional polymerizable liquid crystal compound and a monofunctional polymerizable liquid crystal compound.

The term "multifunctional polymerizable liquid crystal compound" as used herein may refer to a liquid crystal compound including at least two polymerizable functional groups among the liquid crystal compounds. In one embodiment, the multifunctional polymerizable liquid crystal compound may include 2 to 10, 2 to 8, 2 to 6, 2 to 5, 2 to 4, 2 to 3, or 2 polymerizable functional groups. Also, the term "monofunctional polymerizable liquid crystal compound" as used herein may refer to a liquid crystal compound including one polymerizable functional group among the liquid crystal compounds.

If the liquid crystal layer includes both of the multifunctional and monofunctional polymerizable compounds, the phase retardation properties of the liquid crystal layer may be effectively controlled, and the realized phase retardation properties such as the optical axis and a phase retardation value thereof, may be stably maintained. The term "optical axis" as used herein may refer to a slow axis or fast axis when light passes through a certain region.

The liquid crystal layer may include the monofunctional polymerizable liquid crystal compound in an amount of greater than 0 parts by weight and not more than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, relative to 100 parts by weight of the multifunctional polymerizable liquid crystal compound.

The effect obtained by mixing the multifunctional and monofunctional polymerizable liquid crystal compounds may be maximized within the above weight ratios. Also, the liquid crystal layer may exhibit an excellent adhesive property to the adhesive layer. Unless defined otherwise, the unit "part by weight" may refer to a weight ratio herein.

In one embodiment, the multifunctional or monofunctional polymerizable liquid crystal compound may be a compound represented by the following Formula 1.

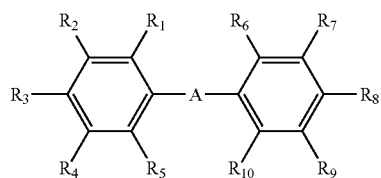

Formula 1

In Formula 1, A may be a single bond, —COO— or —OCO—, and $R_1$ to $R_{10}$ may be each independently hydrogen, a halogen, an alkyl group, an alkoxy group, an alkoxycarbonyl group, a cyano group, a nitro group, —O-Q-P or a substituent represented by the following Formula 2, or a pair of two adjacent substituents among $R_1$ to $R_5$ or a pair of two adjacent substituents among $R_6$ to $R_{10}$ may be joined together to form a benzene ring substituted with —O-Q-P, with the proviso that at least one of the $R_1$ to $R_{10}$ is —O-Q-P or a substituent of the Formula 2, or at least one pair of two adjacent substituents among $R_1$ to $R_5$ or among $R_6$ to $R_{10}$ is joined together to form a benzene ring substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

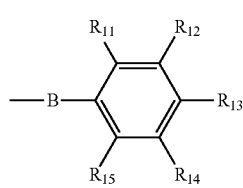

Formula 2

In Formula 2, B may be a single bond, —COO— or —OCO—, and $R_{11}$ to $R_{15}$ may be each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene substituted with —O-Q-P, with the proviso that at least one of substituents $R_{11}$ to $R_{15}$ is —O-Q-P, or two adjacent substituents among $R_{11}$ to $R_{15}$ are joined together to form a benzene substituted with —O-Q-P, where Q may be an alkylene group or an alkylidene group, and P may be a polymerizable functional group such as an alkenyl group, an epoxy group, a cyano group, a carboxyl group, an acryloyl group, a methacryloyl group, an acryloyloxy group or a methacryloyloxy group.

In Formulas 1 and 2, the term "two adjacent substituents being joined together to form a benzene substituted with —O-Q-P" may refer to the two adjacent substituents being joined together so as to form a naphthalene backbone substituted with —O-Q-P as a whole.

In Formula 2, the mark "-" indicated on the left side of the "B" may refer to the "B" being directly bound to the benzene ring of Formula 1.

In Formulas 1 and 2, the term "single bond" may mean that no atom is present in a site represented by the "A" or "B." For example, if the "A" in Formula 1 is a single bond, the benzene rings disposed on both sides of A may be directly bound to form a biphenyl structure.

In Formulas 1 and 2, the halogen may be, for example, chlorine, bromine or iodine.

Unless defined otherwise, the term "alkyl group" as used herein may refer to, for example, a linear or branched alkyl group having 1 to 20 carbon atoms, 1 to 16 carbon atoms, 1 to 12 carbon atoms, 1 to 8 carbon atoms or 1 to 4 carbon atoms, or, for example, a cycloalkyl group having 3 to 20 carbon atoms, 3 to 16 carbon atoms or 4 to 12 carbon atoms. The alkyl group may be optionally substituted with one or more substituents.

Unless defined otherwise, the term "alkoxy group" as used herein may refer to, for example, an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Unless defined otherwise, the term "alkylene group or alkylidene group" may refer to, for example, an alkylene group or alkylidene group having 1 to 12 carbon atoms, 4 to 10 carbon atoms or 6 to 9 carbon atoms. The alkylene group or alkylidene group may be, for example, linear, branched or cyclic. Also, the alkylene group or alkylidene group may be optionally substituted with one or more substituents.

Unless defined otherwise, the term "alkenyl group" may refer, for example, to an alkenyl group having 2 to 20 carbon atoms, 2 to 16 carbon atoms, 2 to 12 carbon atoms, 2 to 8 carbon atoms or 2 to 4 carbon atoms. The alkenyl group may be, for example, linear, branched or cyclic. Also, the alkenyl group may be optionally substituted with one or more substituents.

In one embodiment, in Formulas 1 and 2, the "P" may be, for example, an acryloyl group, a methacryloyl group, an acryloyloxy group or a methacryloyloxy group; or, for example, an acryloyloxy group or a methacryloyloxy group. In another embodiment, the "P" may be, for example, an acryloyloxy group.

In this document, examples of the substituent that may be substituted with a certain functional group may include an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but it is not limited thereto.

In one embodiment, the "—O-Q-P" or the substituent represented by the Formula 2 which may be included in at least one position selected from the group consisting of the $R_1$ to $R_{10}$ or the group consisting of the $R_{11}$ to $R_{15}$ in Formulas 1 and 2 may be, for example, included in a position of $R_3$, $R_8$ or $R_{13}$. In one embodiment, substituents that may be joined together to form a benzene ring substituted with —O-Q-P may be, for example, $R_3$ and $R_4$, or $R_{12}$ and $R_{13}$. Also, in Formulas 1 and 2, the substituents other than the —O-Q-P or the substituent of Formula 2, or the substituents other than the substituents being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, an alkoxy group having 1 to 4 carbon atoms, a cyano group or a nitro group; or in another embodiment, they may be, for example, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The polymerizable liquid crystal compounds may be included in the liquid crystal layer under the state where they are horizontally aligned. In one embodiment, the polymerizable liquid crystal compounds may be polymerized under the state where they are horizontally aligned. The term "being horizontally aligned" as used herein may mean that the optical axis of the liquid crystal layer including liquid crystal compounds has an inclination angle of approximately 0° to approximately 25°, approximately 0° to approximately 15°, approximately 0° to approximately 10°, approximately 0° to approximately 5°, or approximately 0° with respect to the plane of the liquid crystal layer.

In one embodiment, the liquid crystal layer may be formed so that incident light, for example, light entering therein after passing through a polarizer, can be divided into two or more kinds of light having different polarization states to each other. For this purpose, the liquid crystal layer may include, for example, a first region and a second region. The first and second regions may have different phase retardation properties to each other. The term "first and second regions having different phase retardation properties to each other" as used herein may include a case where the first and second regions have optical axes formed in the same or different directions and also have different phase retardation values under the state where both of the first and second regions have the phase retardation properties; and a case where the first and second regions have optical axes formed in different directions and have the same phase retardation value. In another embodiment, the term "first and second regions having different phase retardation properties to each other" as used herein may also include a case where one of the first and second regions has a phase retardation property, and the other region is an optically isotropic region having no phase retardation property. Examples of the above case may include a case where the liquid crystal layer include a region in which the liquid crystal compounds are included, and a region in which the liquid crystal compounds are not included. The phase retardation property of the first or second region may be regulated, for example, by controlling an alignment state of the liquid crystal compound, the above refractive index relationship of the liquid crystal layer or the thickness of the liquid crystal layer.

In one embodiment, as shown in FIG. 1, the first region "A" and the second region "B" may have stripe shape extending in the same direction and may be adjacent to each other and alternately arranged. In other embodiment, as shown in FIG. 2, the first region "A" and the second region "B" may be formed in a lattice pattern and alternately arranged adjacent to each other.

In case where the optical device is used to display stereoscopic image, one of the first and second regions may be a polarization modulation region for an image signal for the left eye (hereinafter, referred to as "LC region"), and the other region may be a polarization modulation region for an image signal for the right eye (hereinafter, referred to as "RC region").

In one embodiment, the two or more kinds of light having the different polarization states, which are divided by the liquid crystal layer including the first and second regions, may include linearly polarized lights of which polarized directions are substantially vertical to each other, or include left-circularly polarized light and right-circularly polarized light.

Unless defined otherwise, the term "vertical," "horizontal," "perpendicular" or "parallel" used when defining the angle, it means that the angle is substantially "vertical," "horizontal," "perpendicular" or "parallel." For example, the terms may include errors induced from manufacturing errors or variations. Therefore, the terms may, for example, include errors within approximately ±15 degrees, errors within approximately ±10 degrees or errors within approximately ±5 degrees.

In one embodiment, one of the first and second regions may be a region configured not to rotate the polarization axis of the light passing through it, and the other region may be a region configured to rotate the polarization axis of the light passing through it so as for the rotated axis to be perpendicular to the polarization axis of the light which has passed through the region configured not to rotate the polarization axis. In this case, the regions including the polymerizable liquid crystal compound in the liquid crystal layer may be formed only on one of the first and second regions. In the above, the regions which don't include the polymerizable liquid crystal compound may be empty space, or may be a region in which a glass or optically isotropic resin layer, resin film or resin sheet is formed. In another embodiment, one of the first and second regions may be a region configured to convert the light passing through it into left-circularly polarized light, and the other region may be a region configured to convert the light passing through it into right-circularly polarized light. In this case, the first and second regions have optical axes formed in different directions and also have the same phase retardation value, or one of the first and second regions may be a region in which incident light may be phase-retarded by ¼ times of its wavelength, and the other region may be a region in which incident light may be phase-retarded by ¾ times of its wavelength.

In one embodiment, the first and second regions may have the same phase retardation value, for example, a value capable of phase-retarding incident light by ¼ times of its wavelength, and also have optical axes formed in different directions to each other. In the above, the optical axes formed in the different directions may form, for example, an angle of 90 degrees.

If the first and second regions have the optical axes formed in different directions, a line bisecting an angle formed by the optical axes of the first and the second regions may be formed to be vertical or horizontal with respect to the absorption axis of the polarizer in the optical device as described below.

FIG. 3 shows a schematic that can be used for explaining the optical axes arrangement of the first and second regions in case where the first and second regions "A" and "B" in FIG. 1 or 2 have optical axes formed in different directions to each other. Referring to FIG. 3, a line bisecting an angle formed by the optical axes of the first and second regions "A" and "B" may refer to a line bisecting an angle of (Θ1+Θ2). For example, if Θ1 and Θ2 are the same angle, the line bisecting an angle formed by the optical axes may be formed to be horizontal with respect to a boundary line "L" between the first and second regions "A" and "B." In the above, an angle, i.e., (Θ1+Θ2), formed by the optical axes of the first and second regions "A" and "B" may be, for example, 90 degrees.

The optical device may further include a substrate layer. When the optical device further includes the substrate layer, the liquid crystal layer may be formed on one surface of the substrate layer. The substrate layer may have a single-layer or multi-layers structure.

For example, a glass substrate layer or a plastic substrate layer may be used as the substrate layer. Examples of the plastic substrate layer may include a sheet or film including a cellulose resin such as triacetyl cellulose (TAC) or diacetyl cellulose (DAC); a cyclo olefin polymer (COP) such as a norbornene derivative; an acrylic resin such as poly(methyl methacrylate) (PMMA); polycarbonate (PC); a polyolefin such as polyethylene (PE) or polypropylene (PP); polyvinyl alcohol (PVA); poly ether sulfone (PES); polyetheretherketone (PEEK); polyetherimide (PEI); polyethylene naphthalate (PEN); a polyester such as polyethylene terephthalate (PET); polyimide (PI); polysulfone (PSF); or a fluorine resin.

The substrate layer, for example, a plastic substrate layer, may have a lower refractive index than the liquid crystal layer. The refractive index of the substrate layer may be in a range from approximately 1.33 to approximately 1.53. When the substrate layer has a lower refractive index than the liquid crystal layer, it is, for example, desirable to enhance brightness, prevent reflection and improve contrast characteristics.

The plastic substrate layer may be optically isotropic or anisotropic. When the substrate layer is optically anisotropic, the optical axis of the substrate layer may be arranged so that the optical axis of the substrate layer can be perpendicular or horizontal with respect to the above-mentioned line bisecting the angle formed between the optical axes of the first and second regions.

The substrate layer may include an ultraviolet (UV) ray blocking agent or a UV-ray absorbent. When the substrate layer includes the UV-ray blocking agent or absorbent, degradation of the liquid crystal layer caused by UV rays may be prevented. Examples of the UV-ray blocking agent or absorbent may include an organic material such as a salicylic ester compound, a benzophenone compound, an oxybenzophenone compound, a benzotriazol compound, a cyanoacrylate compound or a benzoate compound, or an inorganic material such as zinc oxide or a nickel complex salt. The content of the UV-ray blocking agent or absorbent in the substrate layer is not particularly limited, and may be properly selected in consideration of desired effects. For example, in the manufacture of the plastic substrate layer, the UV-ray blocking agent or absorbent may be included at a content of approximately 0.1% by weight to 25% by weight, based on the weight of the main material of the substrate layer.

A thickness of the substrate layer is not particularly limited, and may be properly regulated according to a desired purpose of use.

Illustrative optical device may further include an alignment layer between the substrate layer and the liquid crystal layer. Referring to FIG. 4, the optical device may sequentially include a liquid crystal layer 101, an alignment layer 102 and a substrate layer 103. The alignment layer may be a layer that serves to align the liquid crystal compound of the liquid crystal layer. As the alignment layer, a conventional alignment layer known in the related field, for example, an alignment layer formed using an imprinting method, a photo alignment layer, or a rubbed alignment layer may be used. In the optical device, the alignment layer is an optional element, and it is also possible to impart an aligning property to the substrate layer by directly rubbing or elongating it without using the alignment layer.

The optical device may further include a polarizing plate. For example, the polarizing plate 201 may be attached to the liquid crystal layer 101, as shown in FIG. 5.

The polarizing plate may include a polarizer. In this document, the terms "polarizer" and "polarizing plate" refer to objects that are distinguishable from each other. That is, the term "polarizer" may refer to a functional element, film or sheet that can extract light vibrating in one direction from incident light vibrating in various directions, and the term "polarizing plate" may refer to a stacked member including at least the polarizer. Another element, film or sheet that may be included with the polarizer in the polarizing plate may be a polarizer protective layer as will be described later. The polarizer of the polarizing plate may have an optical absorption axis formed in a predetermined direction, and an optical transmission axis that is perpendicular with respect to the optical absorption axis. For example, a conventional polarizer such as a poly(vinyl alcohol) (PVA) polarizer may be used as the polarizer. In the polarizing plate, a polarizer protective layer(s) may be formed on one surface or both surfaces of the polarizer. Examples of the polarizer protective layer that may be used herein may include a cellulose film such as TAC or DAC, a resin film such as an amorphous polyolefin film, a polyester film, an acrylic resin film, a polycarbonate film, a polysulfone film, an alicyclic polyimide film or a COP film, or a resin layer that is cured by irradiation with electromagnetic waves.

The polarizing plate may be attached to the liquid crystal layer by an adhesive layer or a pressure-sensitive adhesive layer. For example, when the liquid crystal layer is attached to the polarizer of the polarizing plate, an adhesive layer may be used. On the other hand, when the liquid crystal layer is attached to another layer of the polarizing plate, for example, the polarizer protective layer, a pressure-sensitive adhesive layer may be used. Also, a pressure-sensitive adhesive layer may be formed on one surface of the polarizing plate, which is opposite to the other surface of the polarizing plate facing the liquid crystal layer. When the polarizing plate is attached to the liquid crystal layer by the pressure-sensitive adhesive layer, for the sake of convenience of description, the pressure-sensitive adhesive layer used to attach the polarizing plate to the liquid crystal layer may be referred to as a first pressure-sensitive adhesive layer, and the pressure-sensitive adhesive layer formed on a surface opposite to a surface of the polarizing plate facing the liquid crystal layer may be referred to as a second pressure-sensitive adhesive layer. FIG. 6 shows an optical device In one embodiment. Here, the optical device has a structure in which a second pressure-sensitive adhesive layer 302, a polarizing plate 201, a first pressure-sensitive adhesive layer or adhesive layer 301 and a liquid crystal layer 101 are sequentially stacked.

As such, the second pressure-sensitive adhesive layer may be a pressure-sensitive adhesive layer for attaching the optical device to an optical instrument. As such, examples of the optical instrument may include, for example, a liquid crystal panel of a liquid crystal display device, or an image display element of a stereoscopic image display device.

The adhesive layer may have a glass transition temperature of 36° C. or more, 37° C. or more, 38° C. or more, 39° C. or more, 40° C. or more, 50° C. or more, 60° C. or more, 70° C. or more, 80° C. or more, or 90° C. or more. When the liquid crystal layer is attached to the polarizer using the adhesive layer having the glass transition temperature, an optical device showing excellent durability may be provided. Such an adhesive layer may serve to stably maintain phase retardation properties of the liquid crystal layer. An upper limit of the glass transition temperature is not particularly limited, but may be, for example, approximately 200° C., approximately 150° C., or approximately 120° C.

Also, the adhesive layer may have a thickness of 6 μm or less, 5 μm or less, or 4 μm or less. Durability, for example, an adhesive property to the liquid crystal layer and a phase retardation property of the liquid crystal layer, may be suitably maintained within this thickness range. A lower limit of the thickness of the adhesive layer may be, for example, 0.1 μm, 0.3 μm or 0.5 μm.

In one embodiment, the adhesive layer may include an active energy ray-curable adhesive. The adhesive may include an adhesive composition cured by irradiation with active energy rays. The term "curing of an adhesive composition or a pressure sensitive adhesive composition" as used herein may refer to a process of inducing a physical or chemical action or reaction of a component in the composition so as to express an adhesive property or a pressure-sensitive adhesive property. In the above, the term "active energy ray-curable" may refer to a kind of an adhesive or a pressure-sensitive adhesive composition whose curing may be induced by irradiation with active energy rays. In the above, the "active energy rays" may include particle beams such as alpha-particle beams, proton beams, neutron beams or electron beams, as well as microwaves, infrared rays (IR), UV rays (UV), X rays and gamma rays. In general, the UV rays or electron beams may be used.

The adhesive layer may include a radically polymerizable compound or a cationically polymerizable compound. In one embodiment, the radically or cationically polymerizable compound may be included in the adhesive layer in a polymerized form. As such, the radically polymerizable compound may refer to a compound that can be polymerized by a radical reaction, for example, a radical reaction induced by irradiation with active energy rays, to form an adhesive, and the cationically polymerizable compound may refer to a compound that can be polymerized by a cationic reaction, for example, a cationic reaction induced by irradiation with active energy rays, to form an adhesive. Each of the compounds may be included in the adhesive composition, and may form the adhesive through the curing reaction.

For example, the adhesive composition may include one or both of the radically polymerizable compound and the cationically polymerizable compound.

Examples of the cationically polymerizable compound may include an epoxy compound, a vinyl ether compound, an oxetane compound, an oxolane compound, a cyclic acetal compound, a cyclic lactone compound, a thiirane compound, a thiovinylether compound, a spirortho ester compound, an ethylenically unsaturated compound, a cyclic ether compound or a cyclic thioether compound. In one embodiment, an epoxy compound may be used as the cationically polymerizable compound.

For example, of the cationically polymerizable epoxy compound may include an epoxy resin, an alicyclic epoxy compound, an aliphatic epoxy compound or an aromatic epoxy compound. In the above, examples of the epoxy resin may include a cresol novolac epoxy resin or a phenol novolac epoxy resin. The epoxy resin may have a weight average molecular weight (Mw) of 1,000 to 5,000 or 2,000 to 4,000. The term "weight average molecular weight" as used herein may refer to a converted value with respect to standard polystyrene, which may be measured by Gel Permeation Chromatograph (GPC). Unless defined otherwise, the term "molecular weight" may mean the "weight average molecular weight." A polymer having a molecular weight of 1,000 or more may be used to properly maintain the durability of an adhesive layer, and a polymer having a molecular weight of 5,000 or less may also be used to maintain the workability such as a coating property of a composition.

The term "alicyclic epoxy compound" as used herein may refer to a compound including at least one alicyclic epoxy group. The term "alicyclic epoxy group" as used herein may refer to a functional group having an aliphatic saturated hydrocarbon ring, and two carbon atoms among the carbon atoms constituting the hydrocarbon ring also constitute an epoxy group.

Examples of the alicyclic epoxy compound may include an epoxycyclohexylmethyl epoxycyclohexanecarboxylate compound; an epoxycyclohexane carboxylate compound of alkanediol; an epoxycyclohexylmethyl ester compound of dicarboxylic acid; an epoxycyclohexylmethyl ether compound of polyethyleneglycol; an epoxycyclohexylmethyl ether compound of alkanediol; a diepoxytrispiro compound; a diepoxymonospiro compound; a vinylcyclohexene diepoxide compound; an epoxycyclopentyl ether compound; or a diepoxy tricyclo decane compound. Specifically, the alicyclic epoxy compound that may be used herein may include an esterification product of 7-oxabicyclo[4,1,0]heptane-3-carboxylic acid and (7-oxa-bicyclo[4,1,0]hepto-3-yl)methanol; an esterification product of 4-methyl-7-oxabicyclo[4,1,0] heptane-3-carboxylic acid and (4-methyl-7-oxa-bicyclo[4,1, 0]hepto-3-yl)methanol; an esterification product of 7-oxabicyclo[4,1,0]heptane-3-carboxylic acid and 1,2-ethanediol; an esterification product of (7-oxabicyclo[4,1,0]hepto-3-yl) methanol and adipic acid; an esterification product of (4-methyl-7-oxabicyclo[4,1,0]hepto-3-yl)methanol and adipic acid; or an etherification product of (7-oxabicyclo[4,1,0] hepto-3-yl)methanol and 1,2-ethanediol.

In one embodiment, a difunctional epoxy compound, i.e., a compound having two epoxy groups may be used as the alicyclic epoxy compound, and a compound in which both of the two epoxy groups are alicyclic epoxy groups may be used.

The aliphatic epoxy compound may be an epoxy compound having at least one aliphatic epoxy group that is not the alicyclic epoxy group. Examples of the aliphatic epoxy compound may include polyglycidyl ether of aliphatic polyvalent alcohol; a polyglycidyl ether of an alkyleneoxide addition product of aliphatic polyvalent alcohol; a polyglycidyl ether of polyester polyol of aliphatic polyvalent alcohol and aliphatic polyvalent carboxylic acid; a polyglycidyl ether of aliphatic polyvalent carboxylic acid; a polyglycidyl ether of polyester polycarboxylic acid of aliphatic polyvalent alcohol and aliphatic polyvalent carboxylic acid; a dimer, oligomer or polymer obtained by vinyl polymerization of glycidyl acrylate or glycidyl methacrylate; or an oligomer or polymer obtained by vinyl polymerization of the glycidyl acrylate or glycidyl methacrylate and other vinyl monomer. In one embodiment, polyglycidyl ether of an aliphatic polyvalent alcohol or an alkyleneoxide addition product of the polyvalent alcohol may be used, but it is not limited thereto.

In the above, the aliphatic polyvalent alcohol may, for example, be an aliphatic polyvalent alcohol having 2 to 20 carbon atoms, 2 to 16 carbon atoms, 2 to 12 carbon atoms, 2 to 8 carbon atoms or 2 to 4 carbon atoms. For example, the aliphatic polyvalent alcohol may include an aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol, cyclohexanediol, hydrogenated bisphenol A, or hydrogenated bisphenol F; trimethylolethane, trimethylolpropane, a hexitol, a pentitol, glycerin, polyglycerin, pentaerythritol, dipentaerythritol, or tetramethylolpropane.

In the above, the alkyleneoxide may also be an alkyleneoxide having 1 to 20 carbon atoms, 1 to 16 carbon atoms, 1 to 12 carbon atoms, 1 to 8 carbon atoms or 1 to 4 carbon atoms. For example, ethyleneoxide, propyleneoxide or butyleneoxide may be used herein.

In the above, examples of the aliphatic polyvalent carboxylic acid may also include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylic acid methylenecyclohexane, 1,2,3-propanetricarboxylic acid, 1,2,3,4-butanetetracarboxylic acid, or 1,2,3,4-cyclobutanetetracarboxylic acid, but it is not limited thereto.

In one embodiment, a compound that does not include the alicyclic epoxy group and that includes at least three epoxy groups, or three epoxy groups, may be used as the aliphatic epoxy compound when considering a curing property, weather resistance and refractive index characteristics, but it is not limited thereto.

Examples of the aromatic epoxy compound that may be used herein may include an epoxy compound containing an aromatic group in the molecule, for example, a bisphenol-type epoxy resin such as bisphenol A epoxy, bisphenol F epoxy, bisphenol S epoxy or brominated bisphenol epoxy; a novolac-type epoxy resin such as phenol novolac epoxy resin or cresol novolac epoxy resin; a cresol epoxy resin or a resorcinol glycidyl ether.

As the cationically polymerizable compound, for example, a silane compound having a cationically polymerizable functional group may also be used. The silane compound may control a surface energy of an adhesive layer so as to improve an adhesion strength. As the silane compound, for example, a compound represented by the following Formula 3 may be used.

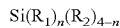  Formula 3

In Formula 3, $R_1$ is a cationically polymerizable functional group bound to the silicon atom, $R_2$ is a functional group bound to the silicon atom, and is, for example, hydrogen, a hydroxyl group, an alkyl group or an alkoxy group, and n is a numberer ranging from 1 to 4.

Examples of the cationically polymerizable functional group may include an alkenyl group such as vinyl group, a vinyloxy group or a cyclic ether group such as a glycidyl group or an oxetanyl group, or a functional group including the cyclic ether group, alkenyl group or vinyloxy group.

In Formula 3, for example, n may be 1 or 2.

In one embodiment, an oligomeric silane compound that is a silicon resin which has a relatively low molecular weight and of which both ends of a molecular chain are blocked by alkoxysilyl groups and to which the cationically polymerizable functional group is introduced may also be used as the silane compound.

A compound which has a radically polymerizable functional group such as an acryloyl group or a methacryloyl group and may be polymerized to form an adhesive may be used as the radically polymerizable compound.

In one embodiment, the radically polymerizable compound may be an acrylamide compound. The acrylamide compound may be represented by the following Formula 4.

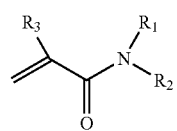  Formula 4

In Formula 4, $R_1$ and $R_2$ are each independently hydrogen, an alkyl group or a hydroxyalkyl group, or $R_1$ and $R_2$ are joined together to form a heterocyclic structure including a nitrogen atom, and $R_3$ is hydrogen or an alkyl group.

Unless defined otherwise, the term "heterocyclic structure" as used herein may refer to a structure of cyclic compound having at least two different kinds of atoms as ring-membered atoms. In Formula 4, the heterocyclic structure may include 3 to 20, 3 to 16, 3 to 12 or 3 to 8 ring-membered atoms, including the nitrogen atom in Formula 4 to which $R_1$ and $R_2$ are linked. In addition to the nitrogen atom, an atom that may be included in the heterocyclic structure may include carbon, oxygen or sulfur. Also, the heterocyclic structure may include an additional nitrogen atom in addition to the nitrogen atom in Formula 4 to which $R_1$ and $R_2$ are linked as long as the heterocyclic structure is formed. The heterocyclic structure may have no unsaturated bond such as a carbon-carbon double bond, or may have at least one unsaturated bond, if necessary. Also, the heterocyclic structure may be optionally substituted with at least one substituent.

Examples of the compound of Formula 4 may include (meth)acrylamide, N-alkyl acrylamide, N-hydroxyalkyl (meth)acrylamide or N-acryloyl morpholine, but it is not limited thereto.

The radically polymerizable compound may also be a compound including a heterocyclic acetal structure. The term "heterocyclic acetal structure" as used herein may refer to a heterocyclic structure including a structure in which two oxygen atoms are bound to the same carbon atom through a single bond. That is, the compound may be a compound including both of the functional group having a heterocyclic acetal structure and the radically polymerizable functional group. For example, the compound may serve as a diluent to regulate the viscosity of a composition, and may also be used to improve an adhesion strength to the liquid crystal layer.

The heterocyclic acetal structure may have 4 to 20, 4 to 16, 4 to 12 or 4 to 8 ring-membered atoms, and may be optionally substituted with at least one substituent.

In one embodiment, the heterocyclic acetal structure may be represented by the following Formula 5 or 6. Therefore, the radically polymerizable compound may include a monovalent residue derived from the compound of the following Formula 5 or 6 along with the radically polymerizable functional group.

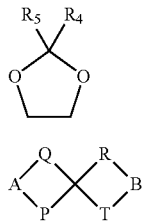

Formula 5

Formula 6

In Formula 5 or 6, $R_4$ and $R_5$ each independently represent hydrogen or an alkyl group, Q, P, R and T are each independently a carbon atom or an oxygen atom, provided that two of Q, P, R and T are oxygen atoms, and A and B each independently represent an alkylene or alkylidene group having 1 to 5 carbon atoms.

In one embodiment, the radically polymerizable compound having the heterocyclic acetal structure may be a compound represented by the following Formula 7.

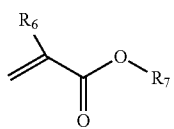

Formula 7

In Formula 7, $R_6$ represents hydrogen or an alkyl group, and $R_7$ is a monovalent residue derived from the compound of Formula 5 or 6, or an alkyl group substituted with the monovalent residue.

Examples of the compound represented by Formula 7 may include (2-ethyl-2-methyl-1,3-dioxolane-4-yl)methyl acrylate, (2-isobutyl-2-methyl-1,3-dioxolane-4-yl)methyl acrylate or (1,4-dioxaspiro[4,5]dec-2-yl)methyl acrylate, but it is not limited thereto.

In one embodiment, the radically polymerizable compound may be a monomer represented by one of Formulas 8 to 10.

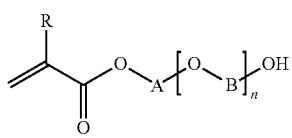

Formula 8

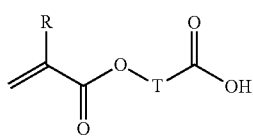

Formula 9

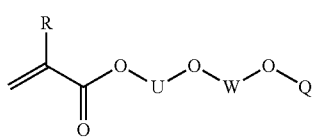

Formula 10

In Formulas 8 to 10, R is hydrogen or an alkyl group, A, B, T, U and W are each independently an alkylene group or an alkylidene group, Q is an alkyl group or an aryl group, and n is an integer ranging from 0 to 5.

Unless defined otherwise, the term "aryl group" as used herein may refer to a monovalent residue derived from a compound or a derivative thereof, which includes a benzene ring or a structure in which two or more benzene rings are condensed or joined together. The aryl group may be, for example, an aryl group having 6 to 22 carbon atoms, 6 to 16 carbon atoms, or 6 to 13 carbon atoms, such as a phenyl group, a phenylethyl group, a phenylpropyl group, a benzyl group, a tolyl group, a xylyl group or a naphthyl group.

In Formula 8, the "n" may be, for example, in a range of 0 to 3, or in a range of 0 to 2. Examples of the compound of Formula 8 may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol(meth)acrylate, but it is not limited thereto.

In Formula 9, the "T" may be, for example, an alkylene group having 1 to 4 carbon atoms. The compound of Formula 9 may include, for example, β-carboxyethyl(meth)acrylate.

In Formula 10, the "Q" may be an alkyl group having 1 to 4 carbon atoms, and the "U" and "W" may each independently be an alkylene group having 1 to 4 carbon atoms. Such a compound may include 2-(2-ethoxyethoxy)ethyl(meth)acrylate, but it is not limited thereto.

In one embodiment, the radically polymerizable compound may be a compound represented by the following Formula 11. For example, such a compound may be used to improve the durability of an adhesive.

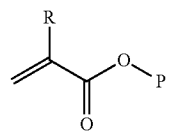

Formula 11

In Formula 11, R is hydrogen or an alkyl group, and P is a monovalent residue derived from an aliphatic saturated cyclic hydrocarbon compound.

In Formula 11, the monovalent residue may refer to a monovalent residue that is induced from an aliphatic saturated cyclic hydrocarbon compound, for example, a compound in which a carbon atom is bound to form a ring structure and which is not an aromatic compound, or a derivative thereof. The aliphatic saturated cyclic hydrocarbon compound may, for example, have 3 to 20 carbon atoms, 6 to 15 carbon atoms, or 8 to 12 carbon atoms. Examples of the monovalent residue may include an isobornyl group, a cyclohexyl group, a norbornanyl group, a norbornenyl group, a dicyclopentadienyl group, ethynylcyclohexane group, an ethynylcyclohexene group or an ethynyldecahydronaphthalene group. In one embodiment, an isobornyl group may be used, but it is not limited thereto.

In one embodiment, an isocyanate-functional acrylic ester compound may also be used as the radically polymerizable compound. As the isocyanate-functional acrylic ester compound, any compound can be used as long as it has both of an isocyanate group and an acryl group. For example, an isocyanate-functional aliphatic acrylic ester compound may be used herein. In one embodiment, a compound represented by the following Formula 12 may be used.

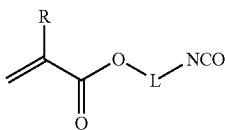

Formula 12

In Formula 12, R represents hydrogen or an alkyl group, and L represents a divalent hydrocarbon group.

In Formula 12, a divalent aliphatic hydrocarbon group may be, for example, used as the divalent hydrocarbon group. Specifically, a divalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, the hydrocarbon group may include a linear, branched or cyclic alkylene; a linear, branched or cyclic alkenylene group; or a linear, branched or cyclic alkynylene group. In one embodiment, the hydrocarbon group may be a linear or branched alkylene or alkynylene group having 1 to 8 carbon atoms.

Examples of the compound may include (meth)acryloyloxyalkyl isocyanate, more particularly (meth)acryloyloxy $(C_{1-8})$alkyl isocyanate, more particularly (meth)acryloyloxy $(C_{1-4})$alkyl isocyanate, and further particularly (meth)acryloyloxy ethyl isocayanate, but it is not limited thereto. In the above, the term "$(C_{1-8})$alkyl" may refer to a linear, branched or cyclic alkyl having 1, 2, 3, 4, 5, 6, 7 or 8 carbon atoms, and the term "$(C_{1-4})$alkyl" may refer to a linear, branched or cyclic alkyl having 1, 2, 3 or 4 carbon atoms.

In one embodiment, a compound represented by the following Formula 13 may be used as the isocyanate-functional acrylic ester compound.

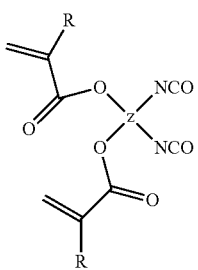

Formula 13

In Formula 13, R represents hydrogen or an alkyl group, and Z represents a tetravalent hydrocarbon group.

In the above, a tetravalent aliphatic hydrocarbon group may be, for example, used as the tetravalent hydrocarbon group. Specifically, a tetravalent aliphatic hydrocarbon group having 1 to 20 carbon atoms, 1 to 16 carbon atoms, 1 to 12 carbon atoms, 1 to 8 carbon atoms or 1 to 4 carbon atoms may be used. For example, a tetravalent hydrocarbon derived from a linear, branched or cyclic alkane; a linear, branched or cyclic alkene; or a linear, branched or cyclic alkyne may be used. The hydrocarbon group may be, for example, a tetravalent hydrocarbon derived from a linear or branched alkane group having 1 to 8 carbon atoms.

Examples of the compound may include a compound commercially available as Laromer LR9000 from BASF.

In one embodiment, a compound having a heterocyclic residue such as tetrahydrofurfuryl(meth)acrylate or (meth) acryloyl morpholine may be used as the radically polymerizable compound.

In one embodiment, the adhesive usable herein may include an adhesive including a cationically curable adhesive composition that includes, as cationically polymerizable compounds, an alicyclic and/or aliphatic epoxy compound, as a main component and optionally an oxetane compound or a silane compound having the cationically polymerizable functional group as a diluent or an additive; a radically curable adhesive composition that includes, as radically polymerizable compounds, the acrylamide compound as a main component and optionally another radically polymerizable compound as an additive; an adhesive composition that includes, as radically polymerizable compounds, a compound represented by one of Formulas 8 to 10 as a main component and optionally another radically polymerizable compound; or a hybrid curable adhesive composition that includes the epoxy resin, or a mixture of the alicyclic epoxy compound and the aliphatic epoxy compound along with a radically polymerizable compound represented by one of Formulas 8 to 10, but it is not limited thereto. The adhesive composition may be included in the adhesive in a cured state.

The respective components in the adhesive composition and a mixing ratio of the components may be properly selected in consideration of the glass transition temperature and the like.

The adhesive composition forming an adhesive may further include a polymerization initiator. The kind of the polymerization initiator may be properly selected according to the components included in the adhesive composition. For example, a cationic polymerization initiator and/or a radical polymerization initiator may be used herein.

For example, as the radical polymerization initiator, an initiator such as a benzoin compound, a hydroxyketone compound, an aminoketone compound or a phosphine oxide compound may be used, and, in one embodiment, a phosphine oxide compound may be used. Specifically, examples of the radical polymerization initiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphine oxide and 2,4,6-trimethylbenzoyl-diphenyl-phosphine oxide, but it is not limited thereto.

As the cationic polymerization initiator, an initiator capable of releasing a component capable of initiating cationic polymerization by irradiation with active energy rays, for example, an ionized cationic initiator such as an onium salt or an organometallic salt, or a non-ionized cationic initiator such as organic silane or latent sulfonic acid, or other non-ionized compound may be used.

If necessary, the adhesive composition may further include one or more additives such as a thermal curing agent, a catalyst, a UV curing agent, a low molecular material, a silane coupling agent, a scattering agent, a UV stabilizer, a toning agent, a reinforcing agent, a filler, an antifoaming agent, a surfactant, a photosensitizer and a plasticizer.

In the optical device, the liquid crystal layer and the polarizer may be directly attached to each other by the adhesive layer, or they may be attached to each other by positioning a primer layer between the polarizer and the adhesive layer or between the liquid crystal layer and the adhesive layer, if necessary. For example, in case of the optical device 1 in FIG. 1, the primer layer may be formed between the polarizer 11 and the adhesive layer 12 or between the liquid crystal layer 13 and the adhesive layer 12. In this case, the kind of the primer layer is not particularly limited, and various kinds of primer layers used to improve an adhesive property may be generally used herein.

If the liquid crystal layer and the polarizing plate are attached to each other by the first pressure-sensitive adhesive layer, one of the first and second pressure-sensitive adhesive layers may have a storage modulus at 25° C. of 0.02 MPa or more, 0.03 MPa or more, 0.04 MPa or more, 0.05 MPa or more, 0.06 MPa or more, 0.07 MPa or more, 0.08 MPa, greater than 0.08 MPa, or 0.09 MPa or more. Also, if the liquid crystal layer and the polarizing plate are attached to each other by the adhesive layer, the second pressure-sensitive adhesive layer may have a storage modulus falling within the above described ranges. If the first and/or second pressure-sensitive adhesive layers have these storage moduli, an upper limit of the storage moduli of the pressure-sensitive adhesive layers is not particularly limited. For example, the storage modulus may be 0.25 MPa or less, 0.2 MPa or less, 0.16 MPa or less, 0.1 MPa or less, or 0.08 MPa or less. In the optical device, the second pressure-sensitive adhesive layer may have at least this storage modulus. In another embodiment, the second pressure-sensitive adhesive layer may have a storage modulus exceeding 0.08 MPa.

If the first and/or second pressure-sensitive adhesive layers have the storage moduli, the optical device may show excellent durability, and thus show a stable light division property since the phase retardation property of the phase retardation layer is, for example, stably maintained for a long period of time under the severe conditions. Also, it is possible to prevent side effects such as light leakage in optical instruments using the optical device. In addition, the optical device may show excellent resistance to an external pressure or scratch due to its improved hardness property, thereby properly maintaining reworkability.

The first and/or second pressure-sensitive adhesive layers may have a thickness of 25 μm or less, 20 μm or less, or 18 μm or less. When the pressure-sensitive adhesive layer has this thickness, the durability, hardness property and reworkability may be further improved. The pressure-sensitive adhesive layer shows excellent physical properties as the pressure-sensitive adhesive layer becomes thin. Here, a lower limit of the thickness is not particularly limited, but the thickness of the pressure-sensitive adhesive layers may be, for example, adjusted within a range of approximately 1 μm or more, or approximately 5 μm or more in consideration of processability.

The pressure-sensitive adhesive layer may include an acryl pressure-sensitive adhesive, a silicon pressure-sensitive adhesive, an epoxy pressure-sensitive adhesive or a rubber-based pressure-sensitive adhesive.

When the pressure-sensitive adhesive layer includes an acryl pressure-sensitive adhesive, the pressure-sensitive adhesive may be, for example, formed by curing a pressure-sensitive adhesive composition including a thermosetting component, an active energy ray-curable component, or both the thermosetting component and the active energy ray-curable component.

The pressure-sensitive adhesive layer formed of the pressure-sensitive adhesive composition including the thermosetting component may include an acryl polymer cross-linked using a multifunctional cross-linking agent.

For example, an acryl polymer having a molecular weight of 500,000 or more may be used as the acryl polymer cross-linked using the multifunctional cross-linking agent. A polymer having a molecular weight of 500,000 or more may be used to form a pressure-sensitive adhesive layer showing excellent durability under severe conditions. An upper limit of the molecular weight is not particularly limited, and the molecular weight of the acryl polymer may be, for example, adjusted within 2,500,000 or less in consideration of the durability or a coating property of a composition.

In one embodiment, the acryl polymer may include a (meth)acrylic ester monomer and a cross-linking monomer as polymerization units.

For example, an alkyl (meth)acrylate may be used as the (meth)acrylic ester-based monomer, and an alkyl (meth)acrylate containing an alkyl group having 1 to 20 carbon atoms may be used in consideration of the cohesion, glass transition temperature or pressure-sensitive adhesivity of a pressure-sensitive adhesive. Examples of such a monomer may include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate, and tetradecyl (meth)acrylate, which may be used alone or in combination.

In addition, the polymer may further include a cross-linking monomer as a polymerization unit. For example, the polymer may include the (meth)acrylic ester monomer at a content of 80 parts by weight to 99.9 parts by weight and the cross-linking monomer at a content of 0.1 parts by weight to 20 parts by weight as polymerization units. As such, the term "cross-linking monomer" refers to a monomer that can be copolymerized with another monomer used to form an acryl polymer and provide the polymer with a cross-linking functional group after the copolymerization. The cross-linking functional group may form a cross-linking structure through a reaction with a multifunctional cross-linking agent as will be described later.

Examples of the cross-linking functional group may include a nitrogen-containing functional group such as a hydroxyl group, a carboxyl group, an epoxy group, an isocyanate group or an amino group. Copolymerizable monomers which can provide the above-mentioned cross-linking functional group in manufacture of a pressure-sensitive adhesive resin are widely known in the related art. Examples of the cross-linking monomer may include, but are not limited to, a hydroxyl group-containing monomer such as 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl (meth)acrylate, 2-hydroxyethylene glycol (meth) acrylate, or 2-hydroxypropyleneglycol(meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid, and maleic anhydride; or a nitrogen-containing monomer such as (meth)acrylamide, N-vinyl pyrrolidinone or N-vinyl caprolactam, which may be used alone or in combination.

The acryl polymer may include various other monomers as a polymerization unit, when necessary.

For example, the acryl polymer may further include a compound represented by the following Formula 14 as a polymerization unit.

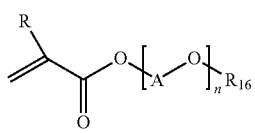

Formula 14

In Formula 14, R represents hydrogen or an alkyl group, A represents an alkylene group or an alkylidene group, $R_{16}$ represents an alkyl group or an aryl group, and n is an integer ranging from 1 to 6.

When the pressure-sensitive adhesive layer includes a cross-linking structure of an active energy ray component as will be described later, for example, the compound of Formula 14 may be useful in enhancing compatibility between the cross-linking structure of the active energy ray component and a cross-linking structure of a thermosetting component and maintaining the physical properties of the pressure-sensitive adhesive layer within an appropriate range.

In another embodiment, n in Formula 14 may be in a range of 1 to 25, 1 to 15, or 1 to 6.

Examples of the monomer of Formula 14 may include an alkoxy alkyleneglycol(meth)acrylic ester, an alkoxy dialkyleneglycol(meth)acrylic ester, an alkoxy trialkyleneglycol (meth)acrylic ester, an alkoxy tetraalkyleneglycol(meth) acrylic ester, an alkoxy polyethylene glycol(meth)acrylic ester, a phenoxy alkyleneglycol(meth)acrylic ester, a phenoxy dialkyleneglycol(meth)acrylic ester, a phenoxy trialkyleneglycol(meth)acrylic ester, a phenoxy tetraalkyleneglycol (meth)acrylic ester, or a phenoxy polyalkyleneglycol(meth) acrylic ester.

When the compound of Formula 14 is included, a weight ratio of the compound may be properly adjusted according to purpose. For example, the compound may be included at a content of 10 parts by weight to 50 parts by weight, based on the total weight of the other monomer.

In addition to the above-described compounds, the polymer may, for example, further include a nitrogen-containing monomer such as (meth)acrylonitrile, (meth)acrylamide, N-methyl(meth)acrylamide or N-butoxy methyl(meth)acrylamide; a styrene-based monomer such as styrene or methyl styrene; glycidyl(meth)acrylate; or a monomer such as carboxylic acid vinyl ester (for example, vinyl acetate) as a polymerization unit. Such additional monomers may be adjusted to a content of 20 parts by weight or less, based on the total weight ratio of the other monomer.

The acryl polymer may be prepared by subjecting a mixture of monomers, which is obtained by optionally selecting and blending the above-described components, to a polymerization method such as solution polymerization, photopolymerization, bulk polymerization, suspension polymerization or emulsion polymerization.

Examples of the multifunctional cross-linking agent serving to cross-link the above-described acryl polymer in the pressure-sensitive adhesive layer may include conventional thermosetting cross-linking agents such as an isocyanate cross-linking agent, an epoxy cross-linking agent, an aziridine cross-linking agent and a metal chelate cross-linking agent. As such, examples of the isocyanate cross-linking agent may include a multifunctional isocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethylene glycol diglycidylether, triglycidylether, trimethylolpropane triglycidylether, N,N,N',N'-tetraglycidyl ethylenediamine and glycerin diglycidylether, examples of the aziridine cross-linking agent may include at least one selected from the group consisting of N,N'-toluene-2,4-bis(1-aziridinecarboxamide), N,N'-diphenylmethane-4, 4'-bis(1-aziridinecarboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but the present application is not limited thereto.

The multifunctional cross-linking agent present in the pressure-sensitive adhesive composition including a thermosetting component or a pressure-sensitive adhesive layer formed of the composition may be, for example, included at a content of 0.01 to 10 parts by weight, or 0.01 to 5 parts by weight, based on 100 parts by weight of the acryl polymer. When a content ratio of the cross-linking agent is adjusted to a content of 0.01 parts by weight or more, cohesion of a pressure-sensitive adhesive may be effectively maintained, whereas, when the content ratio of the cross-linking agent is adjusted to a content of 10 parts by weight or less, it is possible to prevent interlayer detachment or delamination from being caused in the pressure-sensitive adhesive interface and maintain excellent durability. However, the weight ratio may be varied according to desired physical properties such as elastic modulus or inclusion of other cross-linking structures in the pressure-sensitive adhesive layer.

The pressure-sensitive adhesive layer formed of the pressure-sensitive adhesive composition including the active energy ray-curable component may include a cross-linking structure of a polymerized active energy ray-polymerizable compound. The pressure-sensitive adhesive layer may be, for example, formed by blending a compound including at least one functional group which can take part in a polymerization reaction by irradiation of active energy rays, such as, for example, an alkenyl group, an acryloyl group, a methacryloyl group, an acryloyloxy group or a methacryloyloxy group to prepare a pressure-sensitive adhesive composition, and cross-linking and polymerizing the component by irradiating the composition with active energy rays. As such, examples of the compound including the functional group which can take part in the polymerization reaction by irradiation of the active energy rays may include a polymer obtained by introducing a functional group such as an acryloyl group, a methacryloyl group, an acryloyloxy group or a methacryloyloxy group into a side chain of the acryl polymer; a compound known as an active energy ray-curable oligomer in the related art, such as urethane acrylate, epoxy acrylate, polyester acrylate or polyether acrylate; or a multifunctional acrylate as will be described later.

The pressure-sensitive adhesive layer formed of the pressure-sensitive adhesive composition including the thermosetting component and the active energy ray-curable component may have both a cross-linking structure including an acryl polymer cross-linked using the multifunctional cross-linking agent and a cross-linking structure including the polymerized active energy ray-polymerizable compound.

Such a pressure-sensitive adhesive layer is a pressure-sensitive adhesive including an interpenetrating polymer network (hereinafter referred to as "IPN"). The term "IPN" may refer to a state in which at least two cross-linking structures are present in a pressure-sensitive adhesive layer. In one embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize an optical device having excellent workability or an excellent ability to prevent light leakage or crosstalk.

The components listed in the items of the pressure-sensitive adhesive composition including the multifunctional cross-linking agent having a cross-linking structure, which is realized by the acryl polymer cross-linked using the multifunctional cross-linking agent, and the acryl polymer, for example the thermosetting component, may be used in the pressure-sensitive adhesive layer including the IPN.

Also, the above-described compounds may be used as the active energy ray-polymerizable compound having the cross-linking structure of the polymerized active energy ray-polymerizable compound.

In one embodiment, the active energy ray-polymerizable compound may be a multifunctional acrylate. Compounds having at least two (meth)acryloyl groups may be used as the multifunctional acrylate without limitation.

In one embodiment, compounds having a ring structure in the molecule may be used as the multifunctional acrylate. The ring structure included in the multifunctional acrylate may be one of a carbocyclic structure or heterocyclic structure; and a monocyclic or polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane(meth)acrylate (for example, a reaction product of an isocyanate monomer and trimethylolpropane tri(meth)acrylate, etc.), but the present application is not limited thereto.

The active energy ray-polymerizable compound having the cross-linking structure formed in the pressure-sensitive adhesive layer including the IPN may be, for example, included at a content of 5 to 40 parts by weight, based on 100 parts by weight of the acryl polymer, but the content of the active energy ray-polymerizable compound may be varied when necessary.

In addition to the above-described components, the pressure-sensitive adhesive layer may include various additives known in the related art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a pressure-sensitive adhesivity-providing resin, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating and curing a pressure-sensitive adhesive composition prepared by blending the above-described components using a tool such as a bar coater or a comma coater. Also, a method of curing a pressure-sensitive adhesive composition is not particularly limited. For example, the pressure-sensitive adhesive composition may be cured through a process of maintaining a composition at a suitable temperature to perform a cross-linking reaction of the acryl polymer and the multifunctional cross-linking agent, and a process of irradiating a composition with active energy rays to polymerize the active energy ray-curable compound.

When both of the process of maintaining a composition at an appropriate temperature and the process of irradiating a composition with active energy rays are required to be performed, the processes may be performed sequentially or at the same time. As such, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

In the optical device, the first or second pressure-sensitive adhesive layer may be formed by selecting a proper pressure-sensitive adhesive from the kinds of the above-described pressure-sensitive adhesives. In one embodiment, the second pressure-sensitive adhesive layer may be at least a pressure-sensitive adhesive layer including the IPN, and the first pressure-sensitive adhesive layer may be a pressure-sensitive adhesive layer having a cross-linking structure of the thermosetting component, for example, a cross-linking structure including an acryl polymer cross-linked using a multifunctional cross-linking agent, or a pressure-sensitive adhesive layer including the IPN.

The storage modulus and kind of the first or second pressure-sensitive adhesive layer may be more properly selected according to a specific structure of the optical device.

A surface-treated layer may be formed on the optical device. For example, the optical device may further include a substrate layer having a surface-treated layer formed on one surface thereof (hereinafter referred to as a "protective substrate layer"). The other surface of the protective substrate layer having the surface-treated layer formed on one surface thereof, that is, a surface of the protective substrate layer on which no surface-treated layer is formed, may be attached to the above-described substrate layer (hereinafter referred to as a "first substrate layer"), that is, a substrate layer formed on a lower surface of the alignment layer using a pressure-sensitive adhesive layer (hereinafter referred to as a "third pressure-sensitive adhesive layer")

As such, a substrate layer selected from the same category as the above-described first substrate layer may be used as the protective substrate layer.

In the structure, the second pressure-sensitive adhesive layer may be a pressure-sensitive adhesive layer having a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa. The second pressure-sensitive adhesive layer may be a pressure-sensitive adhesive layer including the IPN.

In the structure, the first pressure-sensitive adhesive layer may also be a pressure-sensitive adhesive layer having a cross-linking structure of the thermosetting component or including the IPN. The first pressure-sensitive adhesive layer may have a storage modulus at 25° C. of 0.02 MPa or more, 0.05 MPa or more, or greater than 0.08 MPa. When the first pressure-sensitive adhesive layer is a pressure-sensitive adhesive layer having a cross-linking structure of the thermosetting component, the storage modulus at 25° C. may be adjusted within a range of 0.02 MPa to 0.08 MPa, or 0.04 MPa to 0.08 MPa, and when the first pressure-sensitive adhesive layer is a pressure-sensitive adhesive layer including the IPN, the storage modulus at 25° C. may be adjusted within a range of greater than 0.08 MPa and 0.25 MPa or less, 0.09 MPa to 0.2 MPa, or 0.09 MPa to 0.16 MPa.

As such, a pressure-sensitive adhesive having the same storage modulus and cross-linking component as the first or second pressure-sensitive adhesive layer may be used as the third pressure-sensitive adhesive layer.

In one embodiment, the third pressure-sensitive adhesive layer may be a pressure-sensitive adhesive layer having a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa. A pressure-sensitive adhesive layer including the IPN may be used as the second pressure-sensitive adhesive layer.

In another embodiment, the surface-treated layer may be formed on a surface of the first substrate layer, for example, a surface of the first substrate layer which is opposite to a surface of the first substrate layer on which a liquid crystal layer or an alignment layer is formed. In this case, the protective substrate layer or the third pressure-sensitive adhesive layer may not be formed in the optical device.

In such a structure, the second pressure-sensitive adhesive layer may be a pressure-sensitive adhesive layer having a storage modulus at 25° C. of 0.02 MPa or more, 0.05 MPa or more, greater than 0.08 MPa, greater than 0.08 MPa and 0.25 MPa or less, 0.09 MPa to 0.2 MPa, or 0.09 MPa to 0.16 MPa, and the first pressure-sensitive adhesive layer may have a storage modulus at 25° C. of 0.02 MPa to 0.08 MPa, or 0.04 MPa to 0.08 MPa. As such, the second pressure-sensitive adhesive layer may be a pressure-sensitive adhesive layer including the IPN, and the first pressure-sensitive adhesive layer may be a pressure-sensitive adhesive layer having a cross-linking structure of the thermosetting component.

Examples of the surface-treated layer may include a glare shielding layer such as a high-hardness layer, an anti-glare (AG) or semi-glare (SG) layer, or a low reflective layer such as an anti-reflection (AR) layer or a low reflection (LR) layer.

The surface-treated layer(s) is formed on one primary surface or both primary surfaces of the substrate layer, or may be formed on all of the surfaces of the substrate layer (including side surfaces), when necessary.

The high-hardness layer may have a pencil hardness of 1H or more or 2H or more at a load of 500 g. The pencil hardness may be, for example, measured according to the ASTM D 3363 standard using pencil leads prescribed in KS G 2603.

The high-hardness layer may be, for example, a resin layer having high hardness. The resin layer may, for example, include a room-temperature-curable, moisture-curable, thermosetting or active energy ray-curable resin composition in a cured state. In one embodiment, the resin layer may include a thermosetting or active energy ray-curable resin composition, or an active energy ray-curable resin composition in a cured state. In description of the high-hardness layer, the term "cured state" may refer to a state in which components included in each resin composition are subjected to a cross-linking reaction or a polymerization reaction to convert the resin composition into a hard state. As such, the room-temperature-curable, moisture-curable, thermosetting or active energy ray-curable resin composition may also refer to a composition whose cured state may be induced at room temperature or induced in the presence of suitable moisture or by application of heat or irradiation with active energy rays.

A variety of resin compositions which can satisfy this range of pencil hardness when they are cured are known in the related art, and a suitable resin composition may be readily selected by a person of ordinary skill in the art.

In one embodiment, the resin composition may include an acrylic compound, an epoxy compound, a urethane-based compound, a phenol compound or a polyester compound as a major component. As such, the term "compound" may be a monomeric, oligomeric or polymeric compound.

In one embodiment, an acrylic resin composition having excellent optical properties such as transparency and superior yellowing resistance, preferably an active energy ray-curable acrylic resin composition, may be used as the resin composition.

For example, the active energy ray-curable acrylic composition may include an active energy ray-polymerizable polymer component and a reactive diluting monomer.

As such, examples of the polymer component may include a component widely known in the related art as an active energy ray-polymerizable oligomer, such as urethane acrylate, epoxy acrylate, ether acrylate or ester acrylate, or a polymerization product of a mixture including a monomer such as a (meth)acrylic ester monomer. As such, examples of the (meth)acrylic ester monomer may include an alkyl(meth) acrylate, a (meth)acrylate having an aromatic group, a heterocyclic(meth)acrylate or an alkoxy(meth)acrylate. A variety of polymer components used to prepare the active energy ray-curable composition are known in the related art, and the above-described compounds may be selected, when necessary.

The reactive diluting monomer that may be included in the active energy ray-curable acrylic composition may be a monomer having one or two or more active energy ray-curable functional groups, for example, acryloyl groups or methacryloyl groups. For example, the (meth)acrylic acid ester monomer or the multifunctional acrylate may be used. As such, a suitable kind of the multifunctional acrylate may be selected from the compounds listed in the items of the pressure-sensitive adhesive.

A method of selecting the components used to prepare the active energy ray-curable acrylic composition, and a blending ratio of the selected components are not particularly limited, and may be adjusted in consideration of desired hardness and other physical properties of the resin layer.

For example, a resin layer having an uneven surface formed therein and a resin layer including particles may be used as the AG or SG layer. Also, another resin layer including particles having a different refractive index than the particles of the resin layer may also be used. A resin layer used to form the high-hardness layer may be, for example, used as the resin layer. When the glare shielding layer is formed, the components of the resin composition may not necessarily be adjusted so that the resin layer can surely show high hardness, but the resin layer may be formed so that it can show the high hardness.

A method of forming an uneven surface on a resin layer is not particularly limited. For example, the uneven structure may be realized by curing the resin composition while bringing a coating layer of the resin composition into contact with a mold having a desired uneven structure, or by blending particles having suitable particle sizes with a resin composition and coating and curing the resin composition.

The glare shielding layer may also be formed using particles having a different refractive index than the resin layer.

In one embodiment, the particles have a difference in refractive index of 0.03 or less or 0.02 to 0.2 with respect to the resin layer. When the difference in refractive index is extremely small, it is difficult to induce haze. On the other hand, when the difference in refractive index is extremely high, scattering in the resin layer may often cause an increase in haze, but light transmittance or contrast characteristics may be degraded. Therefore, the particles may be properly selected in consideration of these facts.

The shape of the particles included in the resin layer is not particularly limited. For example, the particles may have a spherical, oval, polyhedral, amorphous shape or other shapes. The particles may have an average diameter of 50 nm to 5,000 nm. In one embodiment, particles having an uneven surface formed therein may be used as the particles. Such particles may, for example, have an average surface roughness (Rz) of 10 nm to 50 nm, or 20 nm to 40 nm, and/or a maximum height of protrusions formed on the particle surfaces may be in a range of approximately 100 nm to 500 nm, or 200 nm to 400 nm, and a width between the protrusions may be in a range of 400 nm to 1,200 nm, or 600 nm to 1,000 nm. Such particles are highly compatible with the resin layer, and show excellent dispersibility in the resin layer.

Examples of the particles may include various inorganic or organic particles. Examples of the inorganic particles may include silica, amorphous titania, amorphous zirconia, indium oxide, alumina, amorphous zinc oxide, amorphous cerium oxide, barium oxide, calcium carbonate, amorphous barium titanate or barium sulfate, and examples of the organic particles may include particles including a cross-linked or uncross-linked product formed of an organic material such as an acrylic resin, a styrene resin, a urethane resin, a melamine resin, a benzoguanamine resin, an epoxy resin or a silicon resin, but the present application is not limited thereto.

The uneven structure formed in the resin layer and the content of the particles are not particularly limited. For example, in the case of the AG layer, the shape of the uneven structure or the content of the particles may be adjusted so that a haze value of the resin layer may be in a range of approximately 5% to 15%, 7% to 13%, or approximately 10%, and, in the case of the SG layer, the shape of the uneven structure or the content of the particles may be adjusted so that a haze value of the resin layer may be in a range of approximately 1% to 3%. For example, the haze value may be measured according to the manufacturer's manual using a hazemeter such as HR-100 or HM-150 (commercially available from SEPUNG).

The low reflective layer such as an AR or LR layer may be formed by coating a low refractive index material. Low refractive index materials which may be used to form the low reflective layer are widely known in the related art. All the low refractive index materials may be properly selected and used in the optical device. The low reflective layer may be formed through coating of the low refractive index material so that the low reflective layer can have reflexibility of approximately 1% or less.

In order to form the surface-treated layer, materials disclosed in Korean Patent Publication Nos. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801 and 2009-0049557 may also be used.

The surface-treated layer may be formed using the known materials, either alone or in combination. Examples of the combination may include a case in which a high-hardness layer is first formed on a surface of a substrate layer and a low-reflection layer is then formed on a surface of the high-hardness layer.

In addition, the optical device may satisfy the requirements of the following Equation 2.

$$Y \leq 200 \text{ nm} \quad \text{General Formula 2}$$

In General Formula 2, Y represents a variation in a length or width of the optical device, as measured when the optical device is attached to a glass substrate by means of the second pressure-sensitive adhesive layer and maintained at 60° C. and a relative humidity of 10% for 150 hours, 300 hours or 500 hours. Also, Y may be, for example, in a range of 170 nm or less, 150 nm or less, 130 nm or less, 110 nm or less, 90 nm or less, 70 nm or less, 50 nm or less, or 40 nm or less. Since decreasing a value of Y means that the optical device has more excellent durability and dimensional stability, a lower limit of Y is not particularly limited.

This application also relates to a stereoscopic image display device. The stereoscopic image display device may include the above-described optical device.

In one embodiment, the stereoscopic image display device may further include an image display element capable of generating an image signal for the left eye (hereinafter referred to as an "L signal") and an image signal for the right eye (hereinafter referred to as an "R signal"). The liquid crystal layer of the optical device may include the above-described first and second regions. Here, the optical device may be attached to the display element by means of the second pressure-sensitive adhesive layer in a state in which the first and second regions of the liquid crystal layer are arranged so that the L signal can penetrate through one of the first and second regions and the R signal can penetrate through the other region.

As such, the optical device may be arranged so that the R and L signals can first penetrate through the polarizing plate of the optical device and then enter each region of the liquid crystal layer when the R and L signals are emitted from the display element.

As long as the stereoscopic image display device includes the optical device as a light-dividing element, a variety of methods known in the related art may be applied to manufacture of the stereoscopic image display device.

FIG. 7 is a schematic diagram of a device In one embodiment, showing the device in which an observer can wear the polarized glasses to observe a stereoscopic image.

As shown in FIG. 7, the device includes, for example, a light source 401, a polarizing plate 402 and an image display element 403, and may have a structure in which the optical device 1, which sequentially includes a second pressure-sensitive adhesive layer 302, a polarizing plate 201 and a liquid crystal layer 101, is attached to the display element 403 by means of the second pressure-sensitive adhesive layer 302.

As such, a direct- or edge-type backlight generally used for liquid crystal display devices (LCDs) may be, for example, used as the light source 401.

The display element 403 may be a transmissive liquid crystal display panel including a plurality of unit pixels which are arranged in a row, column or matrix direction. One or two or more pixels are combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 8, or they may be formed in a lattice pattern and alternately arranged adjacent to each other, as shown in FIG. 9. In the liquid crystal layer 101 of the optical device, the first and second regions correspond to the LC and RC regions, respectively, and may be arranged in consideration of the arrangement of the RG and LG regions so that the R signal to be transmitted to the RG region can be incident to the RC region via the polarizing plate 201 and the L signal can be incident to the LC region via the polarizing plate 201.

The image display element 403 may, for example, be a liquid crystal panel including a first transparent substrate, a pixel electrode, a first alignment film, a liquid crystal layer, a second alignment film, a common electrode, a color filter and a second transparent substrate, which are arranged sequentially in a direction from the light source 401. The polarizing plate 402 may be attached to a side of the panel through which light is incident, for example, one surface of the light source 401, and the optical device may be attached to the other surface, which is arranged opposite to the one surface of the light source 401. A polarizer included in the polarizing plate 402 and a polarizer included in the polarizing plate 201 of the optical device may be, for example, arranged so that the absorption axes of the two polarizers can be formed at a predetermined angle, for example, at an angle of 90°. Therefore, the arrangement of the two polarizers may allow light emitted from the light source 401 to penetrate through the display element 403 or be intercepted by the display element 403.

In a driving state, unpolarized light may be emitted toward the polarizing plate 402 from the light source 401 of the display device 8. In the light incident to the polarizing plate 402, light having a polarization axis parallel to the light transmission axis of the polarizer of the polarizing plate 402 may penetrate through the polarizing plate 402 and be incident to the display element 403. Light incident to the display element 403 and penetrating through the RG region is converted into an R signal, and light penetrating through the LG region is converted into an L signal, and the R and L signals are then incident to the polarizing plate 201 of the optical device.

In the light incident to the liquid crystal layer 101 through the polarizing plate 201, light penetrating through the LC region and light penetrating through the RC region are emitted, respectively, in a state in which the two kinds of light have different polarized states. As described above, the R and L signals having different polarized states may enter the right and left eyes of an observer wearing the polarized glasses, respectively, and thus the observer may observe a stereoscopic image.

Effect

The optical device according to one embodiment may be a light-dividing device, for example, a device that can divide incident light into at least two kinds of light having different polarization states. For example, the optical device can be used to realize a stereoscopic image.

BRIEF DESCRIPTION OF THE DRAWINGS

FIGS. 1 and 2 show schematics of illustrative embodiments of the arrangement of first and second regions of a liquid crystal layer.

Figure 8:
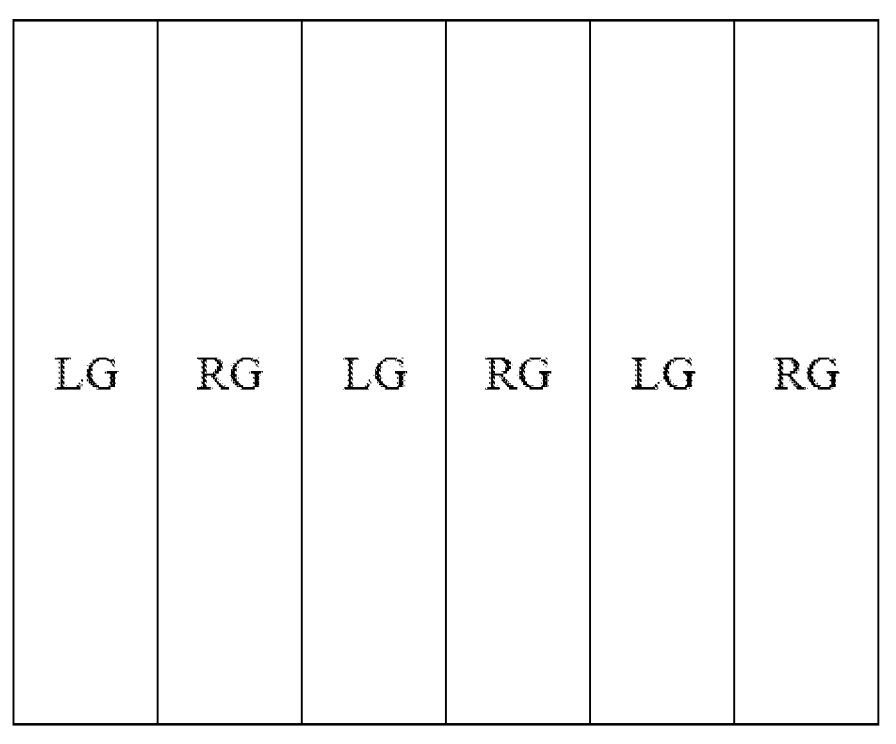

FIGS. 8 and 9 show schematics of illustrative embodiments of the arrangement of RG and LG regions.

DESCRIPTION OF THE MARKS

Figure 1:
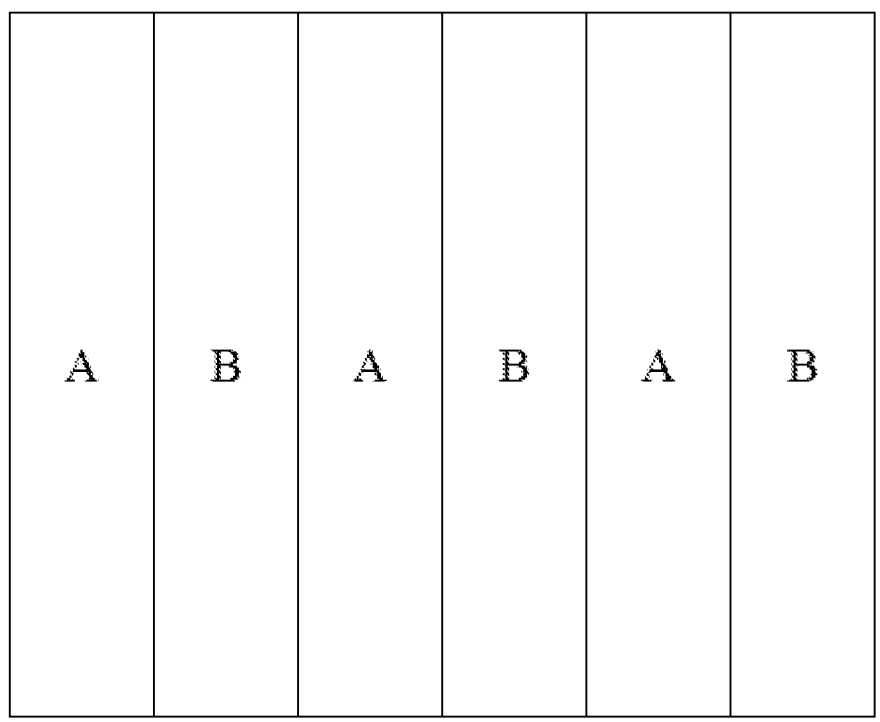
Figure 3:
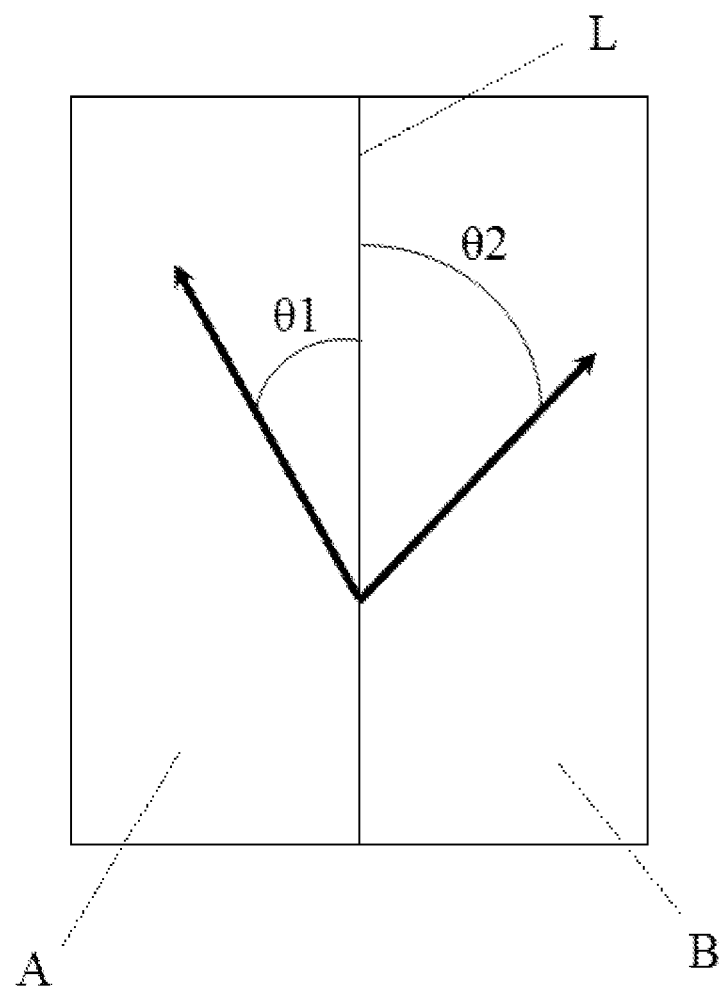
FIG. 3 shows a schematic of an illustrative embodiment of the arrangement of optical axes of the first and second regions of the liquid crystal layer.
Figure 4:
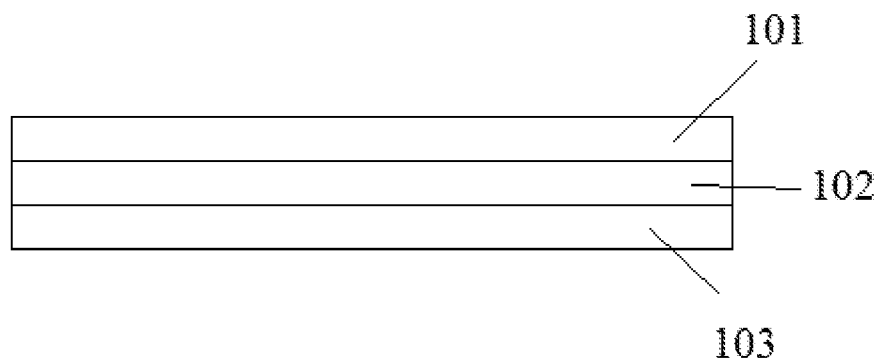
FIGS. 4 to 6 show schematics of illustrative embodiments of optical devices.
Figure 5:
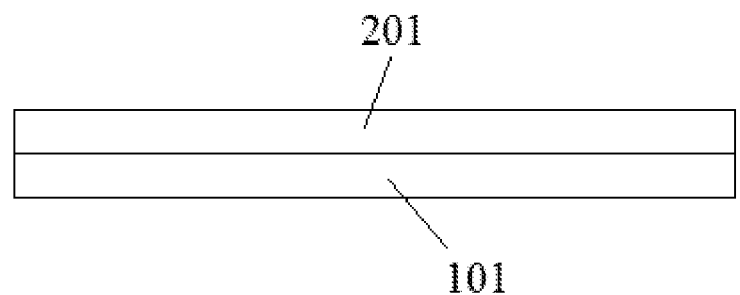
Figure 6:
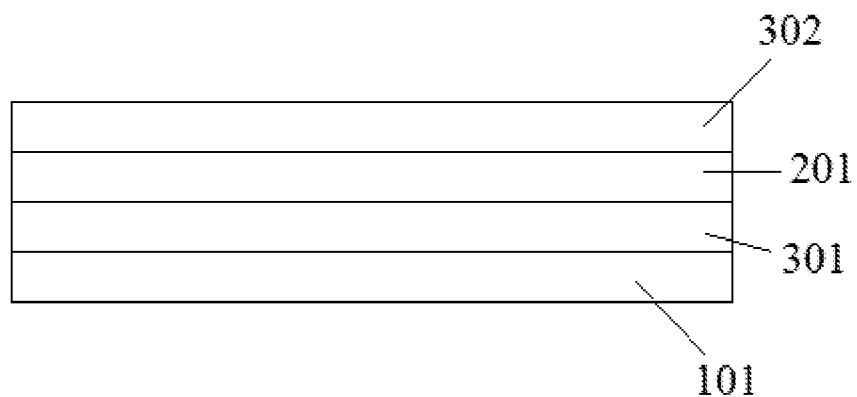

1: The optical device
A, B: the first and second regions of the liquid crystal layer
L: the line bisecting the angle formed by the optical axes of the first and the second regions
Θ1, Θ2: the angle formed by the line (L) and the optical axis of the first or the second region
101: the liquid crystal layer
102: the alignment layer
103: the substrate layer
201, 402: the polarizing plates
302: the second pressure senstivie adhesive
301: the first pressure sensitive adhesive
401: the light source
403: the image display element
LG: the image signal-generating region for the left eye for generating the L signal
RG: the image signal-generating region for the right eye for generating the R signal Illustrative Embodiments Hereinafter, the optical device will be described in further detail with reference to Examples and Comparative Examples. However, the scope of the optical device is not limited to the embodiments disclosed below, but can be implemented in various forms.

1. Evaluation of Durability of Liquid Crystal Layer

The durability of the liquid crystal layer was evaluated by measuring a variation of a phase difference value caused after performing a durability test with respect to the optical device prepared in Examples or Comparative Examples. The optical device was cut into pieces having a width of 10 cm and a length of 10 cm, and then attached to a glass substrate by a pressure-sensitive adhesive layer. The optical device was then kept under a temperature of 80° C. for 100 hours or 250 hours, which was the heat-resistant condition. Then, a decrease (%) in phase difference values of the liquid crystal layer before and after being kept under the heat-resistant condition was calculated as a percentage.

The durability of the liquid crystal layer was evaluated as the below evaluation criteria.

<Evaluation Criteria>

O: The case where variations in phase difference values of all the optical devices after being kept under a heat-resistant condition for 100 hours and 250 hours are less than 8%.

X: The case where variation in phase difference value of any one of the optical devices after being kept under a heat-resistant condition for 100 hours and 250 hours is 8% or more.

2. Crosstalk Evaluation

Figure 7:
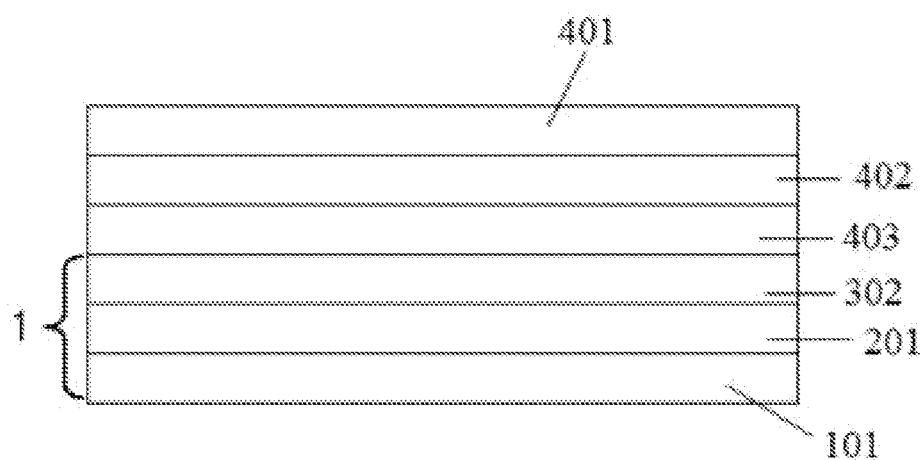
FIG. 7 shows a schematic of an illustrative embodiment of the stereoscopic image display device.

A crosstalk ratio may be defined as a ratio of brightness in a dark state and a bright state when a stereoscopic image is observed. In Examples and Comparative Examples, on the assumption that the optical element is applied to a stereoscopic image display device of a polarized glasses type, a crosstalk ratio is measured using the following method. The optical element is used to constitute a stereoscopic image display device as shown in FIG. 7. Then, the polarized glasses for observing a stereoscopic image are disposed in a conventional observation point for the stereoscopic image display device. As such, when a stereoscopic image is observed by an observer, the conventional observation point refers to a point which is disposed away from the center of the stereoscopic image display device by a distance corresponding to 3/2 of a length in a horizontal direction of the stereoscopic image display device. At such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses for the left and right eyes in the polarized glasses in a state where the stereoscopic image display device is allowed to output an L signal, and each of the lenses for the left and right eyes is measured for brightness. In this case, the brightness measured in the rear surface of the lens for the left eye is bright-state brightness, and the brightness measured in the rear surface of the lens for the right eye is dark-state brightness. After measurement of each brightness, a ratio of the dark-state brightness to the bright-state brightness ([dark-state brightness]/[bright-state brightness]) is converted into a percentage value (%), which may be defined as a crosstalk ratio (Y). Also, the crosstalk ratio may be measured in the same manner as described above, wherein the brightness in the bright and dark states may be measured in a state where a stereoscopic image display device outputs an R signal. In this case, the brightness measured in the rear surface of the lens for the left eye is dark-state brightness, and the brightness measured in the rear surface of the lens for the right eye is bright-state brightness. Similarly, a ratio of the dark-state brightness to the bright-state brightness is converted into a percentage value (%), which may be defined as a crosstalk ratio.

3. Evaluation of Phase Difference and Refractive Index

The phase difference and refractive index of an optical device or a liquid crystal layer were evaluated at a wavelength of 550 nm according to the manufacturer's manual using an Axoscan system (commercially available from Axomatrix).

4. Evaluation of Thickness and Width or Length of Optical Device

The width or length of an optical device was measured using 3-dimensional equipment, Premium 600C and IView Pro program (INTEK IMS Co., Ltd.). Also, the thickness of a liquid crystal layer was measured using a spectral reflectometer, which is equipment that is able to evaluate characteristics of a thin film using light interference between light reflected on a surface of the thin film and light reflected on an interface disposed under the thin film or phase difference of light.

PREPARATIVE EXAMPLE 1

Preparation of Liquid Crystal Layer (A)

A composition for forming an optical alignment layer was coated on one surface of a TAC base (refractive index: 1.49, and thickness: 80,000 nm) so that a thickness of the dried composition could amount to approximately 1,000 Å, and dried at 80° C. for 2 minutes in an oven. As the composition for forming an optical alignment layer, a composition was used, which was prepared by mixing a mixture of an acryl monomer and polynorbornene (molecular weight ($M_w$)=150, 000) having a cinnamate group of the following Formula 15 with a photoinitiator (Irgacure 907) and dissolving the mixture in a toluene solvent so that a solid concentration of the polynorbornene could amount to 2% by weight (polynorbornene:acryl monomer:photoinitiator=2:1:0.25 (weight ratio)).

Formula 15

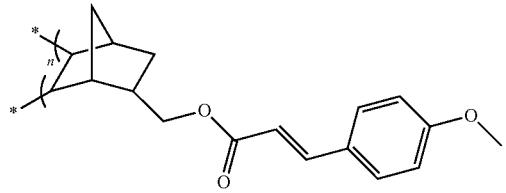

Next, the dried composition for forming an optical alignment layer was aligned according to a method disclosed in Korean Patent Application No. 2010-0009723 to form an optical alignment layer including first and second alignment regions which are aligned in different directions. More particularly, a pattern mask in which light-transmitting portions and light-intercepting portions in stripe shapes having a width of approximately 450 μm were alternately formed in a vertical direction and a horizontal direction was disposed on an upper portion of the dried composition, and a polarizing plate having two regions formed thereon for transmitting two different kinds of polarized light was also disposed on an upper portion of the pattern mask. Then, the composition for forming an optical alignment layer was aligned by irradiating the composition with UV rays (300 mW/cm$^2$) for approximately 30 seconds using the polarizing plate and the pattern mask while transferring the TAC base 30 having the optical alignment film formed thereon at a rate of approximately 3 m/min. Then, a liquid crystal layer was formed on the alignment layer undergoing the alignment treatment. More particularly, as the liquid crystal composition, a liquid crystal composition including 70 parts by weight of a multifunctional polymerizable liquid crystal compound represented by the following Formula A, 30 parts by weight of a monofunctional polymerizable liquid crystal compound represented by the following Formula B, and a suitable amount of a photoinitiator was coated onto the optical alignment layer to a dry thickness of approximately 1 μm, and the liquid crystal composition was aligned according to alignment of the alignment layer arranged under the liquid crystal layer. Then, a liquid crystal layer, which includes first and second regions having different optical axes perpendicular to each other according to the alignment of the optical alignment layer arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and fast axis direction was approximately 0.125.

Formula A

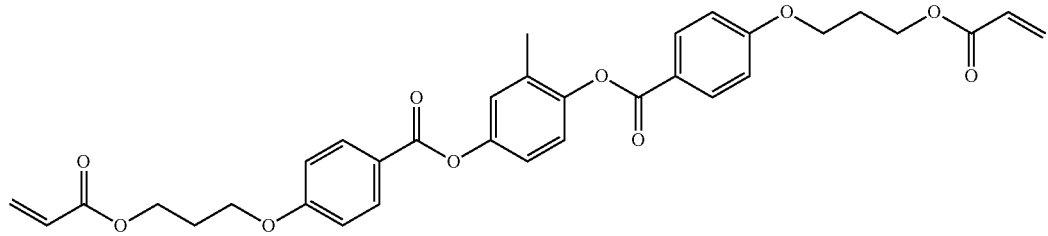

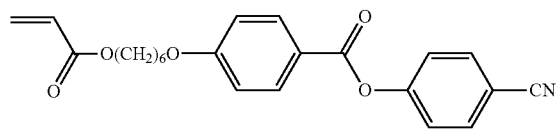

Formula B

PREPARATIVE EXAMPLES 2 to 9

Preparation of Liquid Crystal Layers (B) to (I)

Liquid crystal layers were formed in the same manner as in Preparative Example 1, except that the liquid crystal layers having thicknesses of approximately 0.3 μm, 1 μm and 2.5 μm were formed, respectively, by adjusting compositions of a liquid crystal mixture so that a difference between refractive indexes in a slow axis direction and a fast axis direction amounted to 0.03 after formation of the liquid crystal layers (Preparative Examples 2 to 4). Also, liquid crystal layers were formed using the same liquid crystal compound and in the same manner as in Preparative Example 1, except the liquid crystal layers had thicknesses of approximately 0.3 μm and 2.5 μm, respectively, (Preparative Examples 5 and 6). In addition, liquid crystal layers were formed in the same manner as in Preparative Example 1, except that the liquid crystal layers having thicknesses of approximately 0.3 μm, 1 μm and 2.5 μm were formed, respectively, by adjusting compositions of a liquid crystal mixture so that a difference between refractive indexes in a slow axis direction and a fast axis direction amounted to 0.22 after formation of the liquid crystal layers (Preparative Examples 7 to 9). The thicknesses and differences in refractive indexes of the liquid crystal layers prepared in Preparative Examples are listed in the following Table 1.

TABLE 1

| | | Difference in refractive index | Thickness (μm) |
|---|---|---|---|
| Preparative Example 2 | Liquid crystal layer (B) | 0.03 | 0.3 |
| Preparative Example 3 | Liquid crystal layer (C) | 0.03 | 1 |
| Preparative Example 4 | Liquid crystal layer (D) | 0.03 | 2.5 |
| Preparative Example 5 | Liquid crystal layer (E) | 0.125 | 0.3 |
| Preparative Example 6 | Liquid crystal layer (F) | 0.125 | 2.5 |
| Preparative Example 7 | Liquid crystal layer (G) | 0.22 | 0.3 |
| Preparative Example 8 | Liquid crystal layer (H) | 0.22 | 1 |
| Preparative Example 9 | Liquid crystal layer (I) | 0.22 | 2.5 |

Difference in refractive index: difference in in-plane refractive indexes of a liquid crystal layer in a slow axis direction and a fast axis direction

PREPARATIVE EXAMPLE 10

Preparation of Liquid Crystal Layer (J)

A liquid crystal layer was formed in the same manner as in Preparative Example 1, except that a liquid crystal composition was prepared by blending 55 parts by weight of a multi-functional polymerizable liquid crystal compound (Formula A) and 45 parts by weight of a monofunctional polymerizable liquid crystal compound (Formula B). A difference in refractive index of the liquid crystal layer in the slow axis direction and the fast axis direction was approximately 0.125, and a thickness of the liquid crystal layer was 1 μm.

EXAMPLE 1

An optical device was manufactured as follows. First, in a structure prepared in Preparative Example 1, that is, a structure in which a TAC base, an alignment film and a liquid crystal layer were sequentially formed, the liquid crystal layer was attached to a conventional polarizing plate, which includes a polyvinyl alcohol polarizer formed on one surface thereof, and polarizer protective films (TAC films) formed on both surfaces of the polyvinyl alcohol polarizer, using a known pressure-sensitive adhesive. More particularly, the liquid crystal layer was coated with a pressure-sensitive adhesive composition so that a thickness of a coating layer formed after curing of the pressure-sensitive adhesive composition could amount to 1 μm, and the polarizing plate was laminated onto the coating layer. Then, the composition was cured under proper conditions to attach the polarizing plate to the liquid crystal layer. Thereafter, a conventional acrylic pressure-sensitive adhesive layer was formed on one surface of the polarizer protective film of the polarizing plate to manufacture an optical device having a structure in which the TAC base, the alignment layer, the liquid crystal layer, the pressure-sensitive adhesive layer, the TAC film (i.e., a polarizer protective film), the polyvinyl alcohol polarizer, the TAC film (i.e., a polarizer protective film) and the pressure-sensitive adhesive layer were sequentially stacked.

EXAMPLE 2

An optical device was manufactured in the same manner as in Example 1, except that the liquid crystal layer prepared in Preparative Example 10 was used.

COMPARATIVE EXAMPLES 1 to 8

Optical devices were manufactured in the same manner as in Example 1, except that the liquid crystal layers prepared in Preparative Examples 2 to 9 were used.

The optical devices prepared in Examples and Comparative Examples were evaluated for durabilities and crosstalk ratios of the liquid crystal layers. The evaluation results are listed in the following Table 2.

TABLE 2

| | | Liquid crystal layers | | Crosstalk ratio (%) | Durability of liquid crystal layer |
|---|---|---|---|---|---|
| | | Difference in refractive index | Thickness (μm) | | |
| Example 1 | Liquid crystal layer (A) | 0.125 | 1 | 0.5 | ○ |
| Example 2 | Liquid crystal layer (J) | 0.125 | 1 | 0.5 | ○ |
| Comparative Example 1 | Liquid crystal layer (B) | 0.03 | 0.3 | 79.5 | ○ |
| Comparative Example 2 | Liquid crystal layer (C) | 0.03 | 1 | 45.3 | ○ |

TABLE 2-continued

| | | Liquid crystal layers | | Cross- talk ratio (%) | Durability of liquid crystal layer |
|---|---|---|---|---|---|
| | | Difference in refractive index | Thickness (μm) | | |
| Comparative Example 3 | Liquid crystal layer (D) | 0.03 | 2.5 | 10.3 | ○ |
| Comparative Example 4 | Liquid crystal layer (E) | 0.125 | 0.3 | 36 | ○ |
| Comparative Example 5 | Liquid crystal layer (F) | 0.125 | 2.5 | 177.4 | ○ |
| Comparative Example 6 | Liquid crystal layer (G) | 0.22 | 0.3 | 14.6 | ○ |
| Comparative Example 7 | Liquid crystal layer (H) | 0.22 | 1 | 30.7 | ○ |
| Comparative Example 8 | Liquid crystal layer (I) | 0.22 | 2.5 | 121.6 | ○ |

What is claimed is:

1. An optical device comprising a liquid crystal layer, wherein the liquid crystal layer comprises a monofunctional polymerizable liquid crystal compound and a multifunctional polymerizable liquid crystal compound, wherein the monofunctional polymerizable liquid crystal compound is included in an amount of 100 parts by weight or less relative to 100 parts by weight of the multifunctional polymerizable liquid crystal compound, wherein the liquid crystal layer includes a first region and a second region, which have different phase retardation properties to each other, wherein a difference between the refractive index in the in-plane slow axis direction of the liquid crystal layer and the refractive index in the in-plane fast axis direction of the liquid crystal layer is from 0.05 to 0.2, and the liquid crystal layer has a thickness of 0.5 μm to 2.0 μm, and wherein the liquid crystal layer satisfies the following General Formula 1:

$$X < 8\% \qquad \text{General Formula 1}$$

wherein X represents a percentage of the absolute value of a variation in a phase difference value of the liquid crystal layer obtained after keeping the liquid crystal layer at 80° C. for 100 hours, relative to the initial phase difference value of the liquid crystal layer.

2. The optical device of claim 1, wherein the liquid crystal compounds are represented by the following Formula 1:

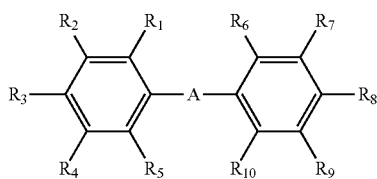

Formula 1 wherein A is a single bond, —COO— or —OCO—, $R_1$ to $R_{10}$ are each independently hydrogen, a halogen, an alkyl group, an alkoxy group, an alkoxycarbonyl group, a cyano group, a nitro group, —O-Q-P or a substituent represented by the following Formula 2, or a pair of two adjacent substituents among $R_1$ to $R_5$ or a pair of two adjacent substituents among $R_6$ to $R_{10}$ is joined together to form a benzene ring substituted with —O-Q-P, with the proviso that at least one of the $R_1$ to $R_{10}$ is —O-Q-P or a substituent of the Formula 2, or at least one pair of two adjacent substituents among $R_1$ to $R_5$ or among $R_6$ to $R_{10}$ is joined together to form a benzene ring substituted with —O-Q-P; Q is an alkylene group or an alkylidene group, and P is an alkenyl group, an epoxy group, a cyano group, an acryloyl group, a methacryloyl group, an acryloyloxy group or a methacryloyloxy group,

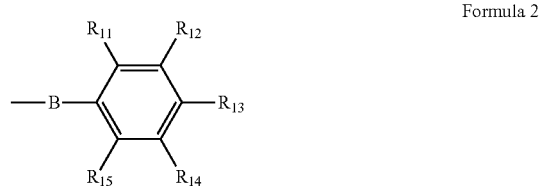

Formula 2 wherein B is a single bond, 13 COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, or a pair of two adjacent substituents among $R_{11}$ to $R_{15}$ is joined together to form a benzene substituted with —O-Q-P, with the proviso that at least one of substituents $R_{11}$ to $R_{15}$ is —O-Q-P, or two adjacent substituents among $R_{11}$ to $R_{15}$ are joined together to form a benzene substituted with —O-Q-P; Q is an alkylene group or an alkylidene group, and P is an alkenyl group, an epoxy group, a cyano group, an acryloyl group, a methacryloyl group, an acryloyloxy group or a methacryloyloxy group.

3. The optical device of claim 1, wherein the liquid crystal compounds are comprised in the liquid crystal layer under the state where it is horizontally aligned.

4. The optical device of claim 1, further comprising a substrate layer, and wherein the liquid crystal layer is formed on one surface of the substrate layer.

5. The optical device of claim 4, further comprising an alignment layer formed between the substrate layer and the liquid crystal layer.

6. The optical device of claim 1, further comprising a polarizing plate which is attached to the liquid crystal layer and which comprises a polarizer.

7. The optical device of claim 6, wherein the liquid crystal layer comprises the first region and the second region have optical axes formed in different directions to each other, and wherein a line bisecting an angle formed by the optical axes of the first and the second regions is vertical or horizontal to the absorption axis of the polarizer.

8. The optical device of claim 6, wherein the polarizing plate is attached to the liquid crystal layer by an adhesive layer or a pressure-sensitive adhesive layer.

9. A stereoscopic image display device comprising the optical device of claim 1.

10. The stereoscopic image display device of claim 9, further comprising image display elements configured to generate image signals for left and right eyes.

11. The stereoscopic image display device of claim 9, wherein the liquid crystal layer of the optical device comprises first and second regions having different phase retardation properties from each other, and wherein the first and second regions of the liquid crystal layer are arranged in the optical device so that the image signal for the left eye can pass through one of the first and second regions and the image signal for the right eye can pass through the other region of the first and second regions.

* * * * *